(12) United States Patent
Sugita et al.

(10) Patent No.: US 9,690,418 B2
(45) Date of Patent: Jun. 27, 2017

(54) TOUCH PANEL AND TOUCH PANEL INTEGRATED DISPLAY DEVICE

(71) Applicant: Sharp Kabushiki Kaisha, Osaka-shi, Osaka (JP)

(72) Inventors: Yasuhiro Sugita, Osaka (JP); Kazutoshi Kida, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 53 days.

(21) Appl. No.: 14/427,064

(22) PCT Filed: Sep. 13, 2013

(86) PCT No.: PCT/JP2013/074868
§ 371 (c)(1),
(2) Date: Mar. 10, 2015

(87) PCT Pub. No.: WO2014/042248
PCT Pub. Date: Mar. 20, 2014

(65) Prior Publication Data
US 2015/0242041 A1   Aug. 27, 2015

(30) Foreign Application Priority Data
Sep. 14, 2012 (JP) ................................. 2012-203615

(51) Int. Cl.
*G09G 3/04* (2006.01)
*G06F 3/041* (2006.01)
(Continued)

(52) U.S. Cl.
CPC ............ *G06F 3/0416* (2013.01); *G06F 3/044* (2013.01); *G06F 3/0412* (2013.01); *G02F 1/13338* (2013.01); *G09G 3/3655* (2013.01)

(58) Field of Classification Search
CPC .. G02F 1/13338; G06F 3/0416; G06F 3/0412; G06F 3/044
See application file for complete search history.

(56) References Cited

U.S. PATENT DOCUMENTS

| | | |
|---|---|---|
| 6,452,514 B1 | 9/2002 | Philipp |
| 2004/0233187 A1* | 11/2004 | Matsumoto .......... G09G 3/2965 345/204 |

(Continued)

FOREIGN PATENT DOCUMENTS

| | | |
|---|---|---|
| CN | 102484471 A | 5/2012 |
| CN | 102609128 A | 7/2012 |

(Continued)

OTHER PUBLICATIONS

Noguchi et al., "Novel In-Cell Capacitive Touch Panel Technology in a Wide Viewing Angle IPS-Mode Display", 31st International Display Research Conference Eurodisplay 2011, Sep. 22, 2011, pp. 1-4.

Primary Examiner — Andrew Sasinowski
Assistant Examiner — Chun-Nan Lin
(74) Attorney, Agent, or Firm — Keating & Bennett, LLP

(57) ABSTRACT

An electrostatic capacitive touch panel having a large surface area includes (i) a driving electrode group (220) and a sensing electrode group (130) which are provided on a substrate (210), and (ii) a touch panel driving circuit (250) provided in a frame region adjacent to a touch panel region where the driving electrode group (220) and the sensing electrode group (130) are provided. The touch panel driving circuit (250) is made up of TFTs made of an oxide semiconductor having a wide band gap so that the touch panel driving circuit (250) has a small surface area. This allows the touch panel to have a narrow frame.

8 Claims, 18 Drawing Sheets

(51) Int. Cl.
*G06F 3/044* (2006.01)
*G02F 1/1333* (2006.01)
*G09G 3/36* (2006.01)

(56) References Cited

U.S. PATENT DOCUMENTS

| | | | |
|---|---|---|---|
| 2006/0139334 A1* | 6/2006 | Van Delden | G02F 1/13338 345/173 |
| 2008/0062147 A1* | 3/2008 | Hotelling | G02F 1/13338 345/174 |
| 2010/0182218 A1* | 7/2010 | Daniel | G09F 9/33 345/1.3 |
| 2011/0102409 A1 | 5/2011 | Hayakawa | |
| 2011/0148785 A1 | 6/2011 | Oda et al. | |
| 2011/0148806 A1 | 6/2011 | Oda et al. | |
| 2011/0153263 A1 | 6/2011 | Oda et al. | |
| 2011/0205223 A1* | 8/2011 | Lee | G02B 27/2264 345/419 |
| 2012/0154326 A1 | 6/2012 | Liu | |
| 2012/0154327 A1 | 6/2012 | Liu | |
| 2012/0229414 A1* | 9/2012 | Ellis | G06F 3/044 345/174 |
| 2012/0229420 A1 | 9/2012 | Liu | |
| 2012/0242615 A1* | 9/2012 | Teraguchi | G06F 3/0412 345/174 |
| 2012/0274603 A1* | 11/2012 | Kim | G06F 3/0412 345/174 |
| 2013/0076691 A1 | 3/2013 | Liu | |
| 2014/0049271 A1* | 2/2014 | Trend | G01R 27/2605 324/663 |

FOREIGN PATENT DOCUMENTS

| | | |
|---|---|---|
| JP | 4009005 B2 | 11/2007 |
| JP | 2010-072581 A | 4/2010 |
| JP | 2011-128982 A | 6/2011 |

* cited by examiner

TOUCH PANEL AND TOUCH PANEL INTEGRATED DISPLAY DEVICE

TECHNICAL FIELD

The present invention relates to a touch panel. The present invention more specifically relates to an electrostatic capacitive touch panel to be integrated with a liquid crystal display device etc.

BACKGROUND ART

These days, a touch panel is in widespread use for electronic devices such as a mobile phone, car navigation equipment, a personal computer, and a terminal of a bank etc. The touch panel allows a user to enter a touched position (contact position) by touching the touched position with a fingertip, a pen tip, or the like while visually recognizing an image displayed on a display screen constituted by a liquid crystal display panel etc. Recently, various types of touch panel have been proposed based on a detection principle for detecting a touched position. Among these touch panels, an electrostatic capacitive touch panel is suitably used because it has a simple mechanism, can be manufactured at low cost, and is relatively easily increased in size. Attention has been paid to, particularly, a technique of an in-cell electrostatic capacitive touch panel realized by combining a touch panel with a liquid crystal display device. This is because the in-cell electrostatic capacitive touch panel remarkably contributes to reduction in manufacturing cost and reduction in thickness.

FIG. 14 is an explanatory view schematically explaining an electrostatic capacitive touch panel. (a) of FIG. 14 illustrates a state where the electrostatic capacitive touch panel is combined with a liquid crystal display device so that the electrostatic capacitive touch panel is present above the liquid crystal display device. (b) of FIG. 14 schematically illustrates a configuration of electrodes of the electrostatic capacitive touch panel. (c) of FIG. 14 illustrates an operational principle of the electrostatic capacitive touch panel.

As illustrated in (a) of FIG. 14, a touch panel 100 is provided via a slight space 194 above a display device such as a liquid crystal display device 191, and a surface of the touch panel 100 is covered with a cover glass 193. When a specific position on the cover glass 193 is touched with a fingertip 194, the touched position is detected.

(b) of FIG. 14 illustrates a configuration example of electrodes of the touch panel 100. In (b) of FIG. 14, 110(1), 110(2), . . . , and 110(n) represent respective driving electrodes. Each of the driving electrodes is constituted by a plurality of rhombic electrodes connected in an X-axis direction (in a traverse direction of FIG. 14). The driving electrodes 110(1), 110(2), . . . , and 110(n) are electrically insulated from one another. The reference numeral "110" in (b) of FIG. 14 represents a group of all of the plurality of driving electrodes 110(1) through 110(n). The all of the plurality of driving electrodes 110(1) through 110(n) are described as a driving electrode group 110. Further, "n" of the driving electrode 110(n) is determined in accordance with a size of the touch panel. The driving electrode 110(n) generally means that a plurality of driving electrodes are present.

Similarly, in (b) of FIG. 14, 120(1), 120(2), . . . , and 120(m) represent respective sensing electrodes. Each of the sensing electrodes is constituted by a plurality of rhombic electrodes connected in a Y-axis direction (in a longitudinal direction of FIG. 14). The driving electrodes 120(1), 120(2), . . . , and 120(m) are electrically insulated from one another. The reference numeral "120" in (b) of FIG. 14 represents a group of all of the plurality of sensing electrodes 120(1) through 120(m). The all of the plurality of sensing electrodes 120(1) through 120(m) are described as a sensing electrode group 120. Further, "m" of the sensing electrode 120(m) is determined in accordance with the size of the touch panel. The sensing electrode 120(m) generally means that a plurality of sensing electrodes are present.

(c) of FIG. 14 illustrates a cross-sectional view taken along A-A' line of (b) of FIG. 14, and schematically illustrates a case where the touch panel 100 is "not touched" with a fingertip etc. (a left part of (c) of FIG. 14) and a case where the touch panel 100 is "touched" with a fingertip etc. (a right part of (c) of FIG. 14). In (c) of FIG. 14, arrow lines schematically represent lines of electric force between the driving electrode 110 (1) to which a driving voltage is being applied and the sensing electrodes 120(1) and 120(2). As is clear from (c) of FIG. 14, when the touch panel is touched with a fingertip etc., some of the lines of electric force are grounded via the fingertip. This reduces capacitance between the driving electrode and the sensing electrodes. Such change in the capacitance is detected, so that a position touched by the fingertip etc. is detected.

Patent Literature 1 discloses a driving circuit of an electrostatic capacitive touch panel typified by the electrostatic capacitive touch panel illustrated in FIG. 14. FIG. 15 is an explanatory view explaining the driving circuit disclosed in Patent Literature 1. (a) of FIG. 15 is a diagram illustrating a configuration of the driving circuit. (b) of FIG. 15 is a timing chart explaining an operation of the driving circuit. (c) of FIG. 15 is a table explaining (i) steps shown in the timing chart and (ii) an operational state of the driving circuit. Note that, for convenience of explanation, (b) of FIG. 15 is partially modified from the drawing of Patent Literature 1 (specifically, steps 1 through 7 are added to the drawing of Patent Literature 1). Note also that (c) of FIG. 15 is a newly-added explanatory drawing which is not disclosed in Patent Literature 1.

In (a) of FIG. 15, the reference numeral "100" represents a driving electrode. The driving electrode 100 is connected to a voltage supply source 101. In (a) of FIG. 15, the reference numeral "104" represents a sensing electrode. The sensing electrode 104 is connected via a capacitor 105 to the driving electrode 100. The sensing electrode 104 is connected to a sampling switch 401, a storage capacitor 402, a reset switch 404, and an output amplifier 403. The sampling switch 401 and the reset switch 404 are controlled by a control circuit 108.

When the reset switch 404 is tuned off while the voltage supply source 101 is applying a rectangular wave 109 to the driving voltage 100, an electric charge stored in the storage capacitor 402 is reset (step 1). When the sampling switch 401 is turned on (connected to "1") while the reset switch 404 is in an off state, an electric charge is supplied to the storage capacitor 402 at timing when the rectangular wave 109 has a "High" level (step 3). While (i) the sampling switch 404 is in an on state and the reset switch 404 is in the off state and (ii) the rectangular wave 109 has a "High" level again, an electric charge is stored again (step 6). After storage of electric charges is carried out more than once, measurement is carried out (step 7).

As has been described, when a fingertip etc. is placed between the driving electrode 100 and the sensing electrode 104, capacitance of the capacitor 105 changes (when the fingertip is placed, the capacitance of the capacitor 105 decreases). This causes a change in output voltage 402. The change is detected, so that whether or not a touch of the fingertip is present is detected.

Patent Literature 2 discloses an electrostatic capacitive touch panel (in-cell touch panel) integrated with a color filter on which substrate electrodes for detecting a touched position are provided. FIG. 16 is a diagram schematically illustrating a color filter integrated touch panel disclosed in Patent Literature 2.

In FIG. 16, the reference numeral "50" represents a touch panel integrated color filter which is integrated with electrode sections 60 and 70 for detecting a touched position. The touch panel integrated color filter 50 includes (i) a base material 52, (ii) "a color filter layer 54 including a plurality of colored sections 56" provided above the base material 52, and (iii) the electrode section 60 provided between the color filter layer 54 and the base material 52. The electrode section 70 is provided via an electrically-insulating layer 67 above a first surface of the electrode section 60 which first surface is opposite to a second surface of the electrode section 60 which second surface faces the base material 52. The electrode sections 60 and 70 are electrically connected to a circuit for detecting a contact position at which a fingertip etc. comes into contact with a display surface on a viewer side.

According to a conventional example illustrated in FIG. 16, a touch panel for detecting a touched position is integrated with the color filter on the color filter substrate. It is possible to realize a liquid crystal display device provided with a compact touch panel, the liquid crystal display device eliminating the need for additionally using another touch panel.

Patent Literature 3 describes a sensor array which detects physical quantity of light etc. and carries out parallel driving. Patent Literature 3 describes that an optical sensor is employed as a sensor. The technique described in Patent Literature 3 is applicable to driving of an electrostatic capacitive touch panel.

FIG. 17 is a diagram illustrating a sensor array device described in Patent Literature 3. A two-dimensional sensor array 19 includes (i) a plurality of row electrodes, (ii) a plurality of column electrodes, (iii) pin diodes provided at respective intersections where the plurality of row electrodes intersect the plurality of column electrodes, the pin diodes converting light into electric current, (iv) a driving section including a first shift register 17, a first analog switch 18 and the like, and (v) a detection section including a second shift register 21, a second analog switch 22 and the like.

The two-dimensional sensor array 19 is driven by simultaneously (concurrently) applying an M-sequence signal via the first shift register 17 and the first analog switch 18 to the plurality of column electrodes of the two-dimensional sensor array 19, the M-sequence signal being generated by a first M-sequence signal generator 16. The two-dimensional sensor array 19 detects physical quantity (of light) by (i) sequentially selecting the plurality of row electrodes with the second analog switch 22 and (ii) detecting detection electric currents of optical sensors at intersections where a selected row electrode intersects the respective plurality of column electrodes. A detection output is written in a frame memory 26 via a first correlator 25. Data written in the frame memory 26 is (i) subjected to matrix conversion, (ii) read out, (iii) supplied to a second correlator 27, (iv) computed by the second correlator 27, and then (v) outputted as a restoration output.

Patent Literature 4 describes an electrostatic capacitive touch panel which carries out parallel driving. FIG. 18 is a diagram schematically illustrating the touch panel described in Patent Literature 4.

As illustrated in FIG. 18, a sensor section 100 that constitutes the touch panel includes (i) a plurality of transmission conductors 12 each extending in an X-axis direction and (ii) a plurality of reception conductors 14 each extending in a Y-axis direction. The plurality of transmission conductors 12 simultaneously (concurrently) receive diffusion signs from a diffusion sign supplying circuit 21. The diffusion signs are simultaneously detected by the plurality of reception conductors 14.

A detection output is supplied to a correlation value calculating circuit 34 via a reception conductor selecting circuit 31, an amplifying circuit 32, and an A/D converting circuit 33. A correlation value obtained from the correlation value calculating circuit 34 corresponds to a detection state of a touched position. From the detection state, a position detecting circuit 35 calculates the touched position. Patent Literature 4 describes that a specific example of the diffusion signs is Hadamard sign.

The parallel driving disclosed in Patent Literatures 3 and 4 makes it possible to remarkably shorten a sensing period of a touch panel. It is therefore possible to shorten time intervals for detection of a touched position. That is, it is possible to detect the touched position with a further excellent response. In a case where the sensing period is constant, the number of times of integral can be increased. This can improve an S/N ratio. For example, assume that the number of times of integral was multiplied by M. In this case, the S/N ratio can be multiplied by $\sqrt{M}$.

Non-Patent Literature 1 discloses a semi in-cell electrostatic capacitive touch panel that includes a common electrode (Vcom electrode) of a liquid crystal display device and a driving electrode of the touch panel. The touch panel and a driver for driving the Vcom electrode are provided on a glass substrate so that the driver extends along a side part of the touch panel.

FIG. 19 is a diagram illustrating the semi in-cell touch panel described in Non-Patent Literature 1. A "Vcom driver" is provided in a left side region of the touch panel, and a "Vdriver" is provided in a right side region of the touch panel (see FIG. 19).

CITATION LIST

Patent Literatures

Patent Literature 1
U.S. Pat. No. 6,452,514
Patent Literature 2
Japanese Patent Application Publication, Tokukai, No. 2010-72581
Patent Literature 3
Japanese Patent No. 4009005
Patent Literature 4
Japanese Patent Application Publication, Tokukai, No. 2011-128982

Non-Patent Literature

Non-Patent Literature 1
EuroDisplay2011 11.3 "Novel In-Cell Capacitive Touch Panel Technology" (Sony), which is a non-patent literature announced in the 31st International Display Research Conference Eurodisplay 2011 held in Bordeaux, France on Sep. 22, 2011

SUMMARY OF INVENTION

Technical Problem

The invention of Patent Literature 1 enables an electrostatic capacitive touch panel to detect a position touched with a fingertip etc. Patent Literature 1, however, neither particularly describes specific configurations of (i) a driving electrode of the touch panel and (ii) a touch panel driving circuit section nor discloses a configuration of a compact high-performance touch panel. A sequential driving voltage is supplied to the driving electrode according to a sequential driving method. The sequential driving method has a problem that a sensing period is relatively long.

The invention of Patent Literature 2 can realize a touch panel integrated display device which is downsized. This is because a touch panel is integrated with a display device in the touch panel integrated display device. Patent Literature 2, however, neither describes at all a configuration of a touch panel driving circuit section nor discloses a configuration of a compact high-performance touch panel.

Patent Literatures 3 and 4 disclose parallel driving methods which allow a remarkable reduction in sensing period of a touch panel, but discloses neither a specific configuration of a driving circuit section of the touch panel nor a configuration of a compact high-performance touch panel.

Non-Patent Literature 1 discloses a touch panel provided on a substrate on which a Vcom Driver and a Vdriver themselves are provided. According to the touch panel disclosed in Non-Patent Literature 1, TFTs provided on the substrate are made of LTPS (low-temperature polysilicon). A high voltage cannot be applied to the TFTs. It is therefore not possible to improve performance of the touch panel. Since the TFTs are made of LTPS, the touch panel of Non-Patent Literature 1 further has problems of being high in cost and having difficulty in increasing a screen size. Further, since the TFTs are made of LTPS, flicker of display is caused due to leak photocurrent. It is therefore not possible to drive a display at a low frequency. The touch panel of Non-Patent Literature 1 further has a problem that it is difficult to configure a high-performance touch panel because the touch panel of Non-Patent Literature 1 is driven according to a sequential driving method. The touch panel of Non-Patent Literature 1 further has a problem that it is difficult to carry out parallel driving because liquid crystal is driven by means of IPS (In-Plane Switching). Since only one horizontal (1H) blanking period is employed to drive the touch panel, the number of times of integral is small. Therefore, the touch panel of Non-Patent Literature 1 has a problem that it is difficult to configure the high-performance touch panel.

FIG. 20 schematically illustrates the whole configuration of a conventional and typical touch panel that includes a driving circuit and a detection circuit. The touch panel includes a driving electrode group 110 and a sensing electrode group 120 which are provided on a substrate 100. The driving electrode group 110 is connected via drawing wirings 111 to a touch panel driving and detection control circuit 131 provided on a circuit substrate 130. Similarly, the sensing electrode group 120 is connected via drawing wirings 121 to the touch panel driving and detection control circuit 131 provided on the circuit substrate 130.

The drawing wirings 111 connected to the driving electrode group 110 are provided so as to correspond to the number of driving electrodes. As the number of driving electrodes increases, the number of the drawing lines 111 increases. This results in expanding a space where the drawing wirings 111 are provided, i.e., widening a frame part of the touch panel.

The invention of the present application was made to solve the problems. An object of the present invention is to provide a high-performance touch panel which (i) has a narrow frame part, (ii) less increases resistance of a wiring region, (iii) has an excellent resistance to noise of a display device, and (iv) less malfunctions. Another object of the present invention is to provide a display device integrated with the high-performance touch panel.

Solution to Problem

In order to attain the object, a touch panel of an aspect of the present invention is configured to be a touch panel including: a substrate; sensing electrodes and driving electrodes, each for detection of a touched position, provided on an identical surface or different surfaces of the substrate; a touch panel driving circuit which drives the driving electrodes; and a touched position detecting circuit which detects the touched position upon receipt of a detection output from the sensing electrodes, the touch panel driving circuit being made up of TFTs made of an oxide semiconductor.

Advantageous Effects of Invention

As has been described, according to an aspect of the present invention, it is possible to realize a high-accuracy touch panel having a large surface area that includes a small frame area. It is also possible to provide a large-screen display device which also serves as a touch panel in which large-screen display device the touch panel of the invention of the present application is combined with various large-sized display devices, the large-screen display device less consuming electric power and being highly convenient.

DESCRIPTION OF EMBODIMENTS

Figure 1:
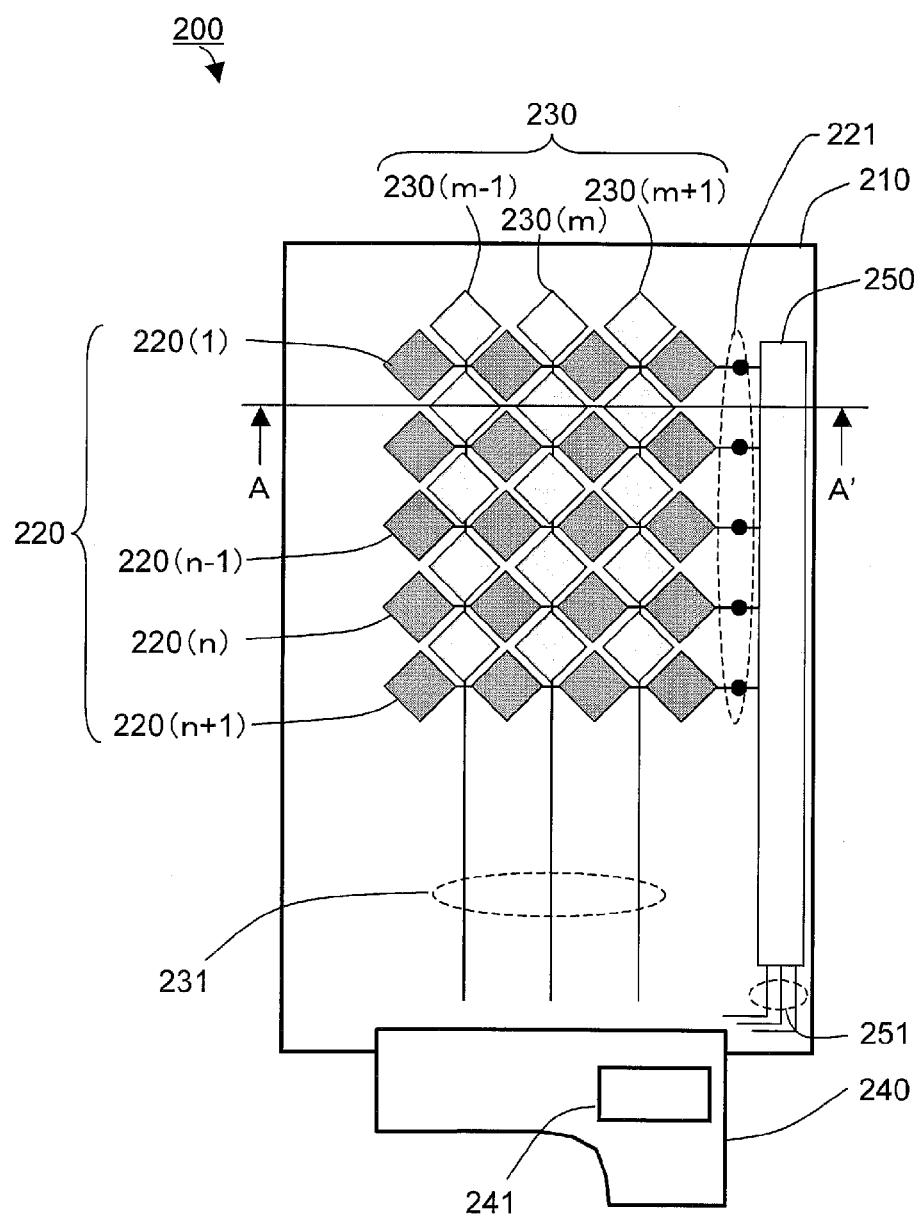
FIG. 1 is an explanatory diagram explaining a planar configuration of a touch panel of an aspect of the present invention.
Figure 2:
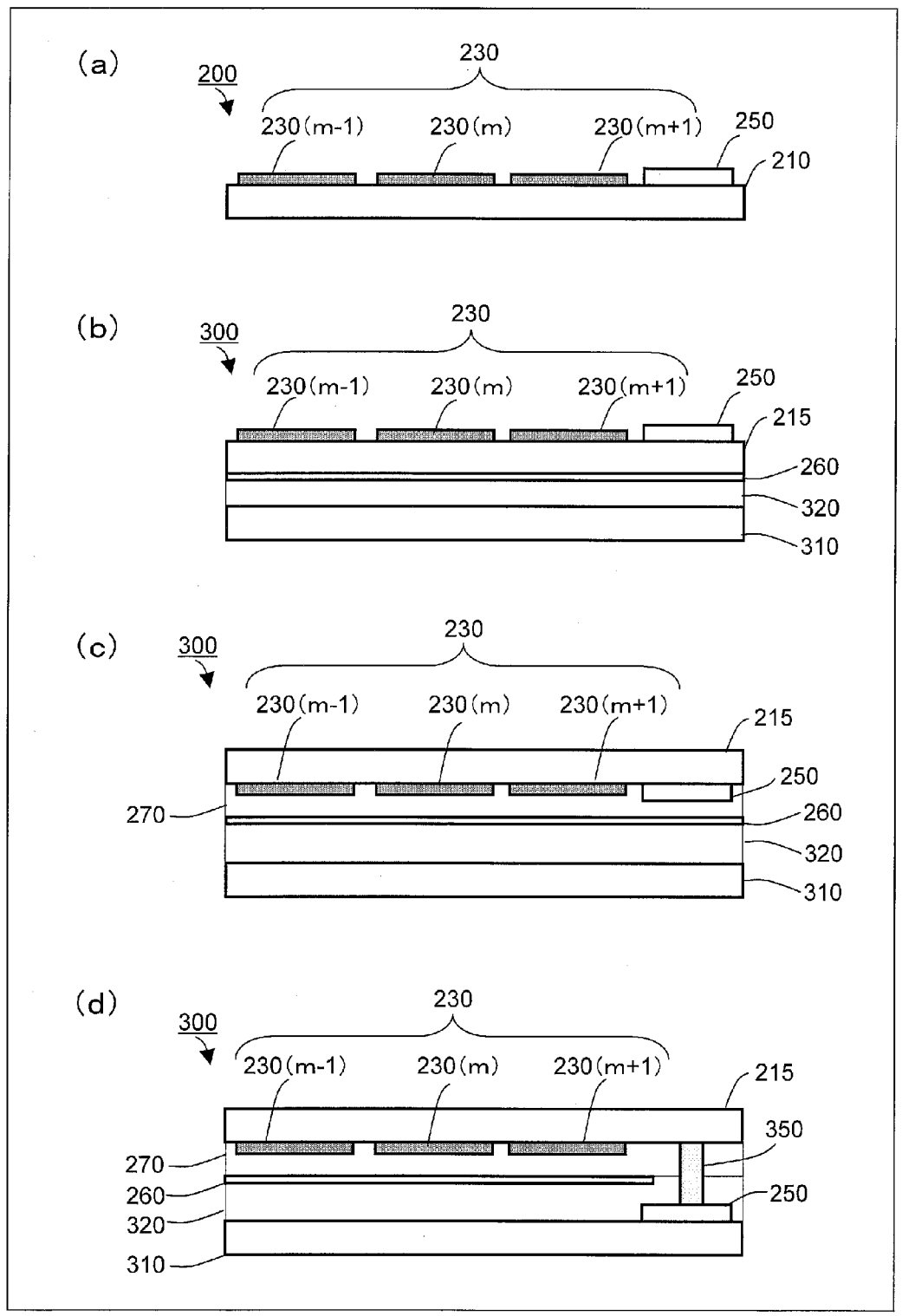
FIG. 2 is an explanatory diagram explaining a cross-sectional structure of the touch panel of the aspect of the present invention.
Figure 3:
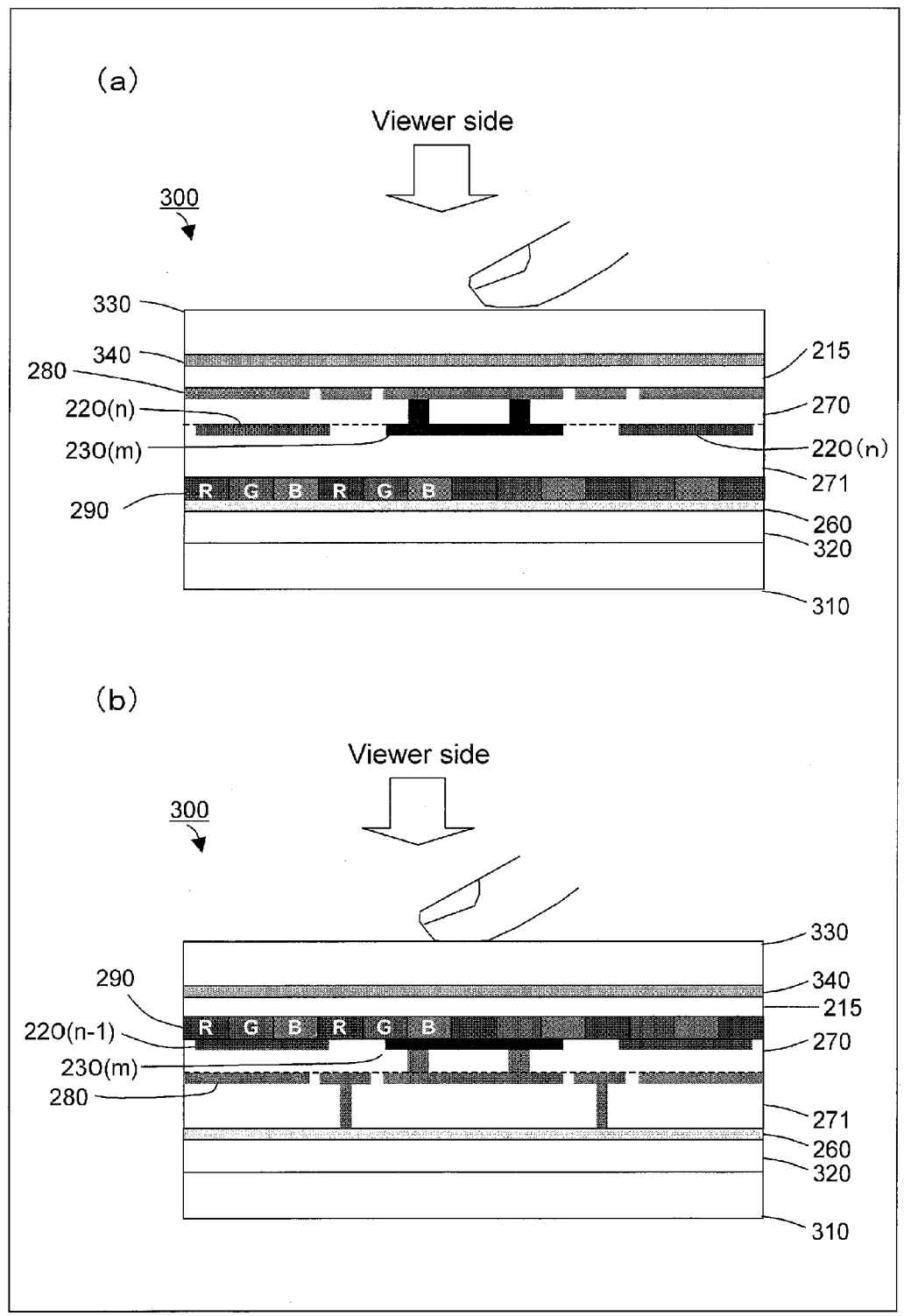
FIG. 3 is a diagram further specifically illustrating a cross-sectional configuration of the touch panel of the aspect of the present invention.

The following description will discuss (i) a basic configuration of the present invention with reference to FIG. 1, and (ii) details of Embodiment (Examples 1 through 4) of the present invention with reference to FIGS. 2 and 3. The following will further discuss, with reference to FIGS. 4 through 13, (i) a configuration of a driving circuit which drives a touch panel of an aspect of the present invention, and (ii) specific examples of driving of the touch panel. Note that, though the following description includes various limitations suitable to put the present invention into practice, the technical scope of the present invention is not limited to the Embodiment and description of the drawings. Note also that identical reference numerals are given to identical members, and therefore, these identical members are not repetitively described in detail. Note also that, for convenience of description, the drawings do not illustrate all members in correct dimensions, but some members are enlarged even in one of the drawings.

(Basic Configuration of the Present Invention)

FIG. 1 is an explanatory diagram explaining a basic configuration of a touch panel of the present invention. FIG. 1 specifically illustrates (i) a configuration of driving electrodes and sensing electrodes and (ii) a planar configuration of arrangement of a touch panel driving circuit which drives the driving electrodes.

In FIG. 1, the reference numeral "200" represents the whole touch panel. The touch panel 200 includes (i) a substrate 210 made of glass etc., (ii) a driving electrode group 220 provided on the substrate 210, (iii) a sensing electrode group 230 provided on the substrate 210, (iv) a touch panel driving circuit 250 provided on the substrate 21, and (v) a control circuit 241 which is provided on a substrate 240 different from the substrate 210 and includes a detection circuit. Note that a region where the driving electrode group 220 and the sensing electrode group 230 are provided is referred to as a touch electrode region in this specification.

The touch panel driving circuit 250 is a circuit for driving driving electrodes of the touch panel. FIG. 1 illustrates an example where the touch panel driving circuit 250 is a TFT circuit which is provided directly on a side part of the substrate 210 so as to extend in a Y-axis direction (in a longitudinal direction of FIG. 1) toward which side part the driving electrode group 220 extends in an X-axis direction (in a traverse direction of FIG. 1). According to the example illustrated in FIG. 1, in a case where the touch panel is combined with a display device, the touch panel driving circuit 250 is located in a frame region adjacent to the touch electrode region which frame region is (not an upper or lower portion of but) a side portion of the display device which a viewer views in a general state.

The display device combined with the touch panel as above can be suitably employed as a display device having a narrow frame. Note, however, that a location where the touch panel driving circuit 250 is provided is not limited to this side portion. That is, in a case where the driving electrode group extends in the longitudinal direction, the touch panel driving circuit may be provided in an upper side portion of the touch panel.

In FIG. 1, the reference numerals "220(1), . . . , 220(n−1), 220(n), and 220(n+1)" represent the respective driving electrodes. Each of the driving electrodes is constituted by a plurality of rhombic electrodes connected in the X-axis direction (in the traverse direction of FIG. 1). The driving electrodes 220(1), . . . , 220(n−1), 220(n), and 220(n+1) are electrically insulated from one another. The reference numeral "220" represents a driving electrode group that includes all of the driving electrodes 220(1), . . . , 220(n−1), 220(n), and 220(n+1), in other words, the whole driving electrode group of the driving electrodes 220(1), . . . , 220(n−1), 220(n), and 220(n+1). Further, "n" of the driving electrode 220(n) is determined in accordance with a size of the touch panel, and generally means that a plurality of driving electrodes are present.

Similarly, in FIG. 1, the reference numerals "230(m−1), 230(m) and 230(m+1)" represent the respective sensing electrodes. Each of the sensing electrodes is constituted by a plurality of rhombic electrodes connected in the Y-axis direction (in the longitudinal direction of FIG. 1). The sensing electrodes 230(m−1), 230(m) and 230(m+1) are electrically insulated from one another. The reference numeral "230" represents a sensing electrode group that includes all of the sensing electrodes 230(m−1), 230(m) and 230(m+1), in other words, the whole sensing electrode group of the sensing electrodes 230(m−1), 230(m) and 230(m+1). Further, "m" of the sensing electrode 230(m) is determined in accordance with the size of the touch panel, and generally means that a plurality of sensing electrodes are present.

The reference numeral "221" represents a connection line group via which the driving electrode group 220 is connected to the touch panel driving circuit 250. The connection line group 221 includes all connection lines of the respective driving electrodes 220(1), . . . , 220(n−1), 220(n), and 220(n+1). Similarly, the reference numeral "231" represents a connection line group via which the sensing electrode 230 is connected to the control circuit 241 that includes the detection circuit. The connection line group 231 includes all connection lines of the respective sensing electrodes 230 (m−1), 230(m) and 230(m+1). The reference numeral "251" represents a connection line group via which the touch panel driving circuit 250 is connected to the substrate 240 on which the control circuit 241 etc. is provided.

The touch panel driving circuit 250, of the touch panel of an aspect of the present invention, which is provided on the substrate 210 made of glass etc. is made up of TFTs made of an oxide semiconductor (such as an Sn—Ga—Zn-based oxide semiconductor or an Al—Ga—Zn-based oxide semiconductor) having (i) a large band gap, (ii) a physical property of being highly resistant to pressure applied for bonding, and (iii) an excellent off-leak characteristic. The touch panel driving circuit 250 is extremely suitably made up of, particularly, TFTs made of an In—Ga—Zn—O-based oxide semiconductor (hereinafter referred to as an InGaZnO-based oxide semiconductor) that is one kind of oxide semiconductors.

Since the InGaZnO-based oxide semiconductor has an electronic mobility which is larger than that of amorphous silicon but smaller than that of polysilicon, the TFTs made of the InGaZnO-based oxide semiconductor etc. can be reduced in size as compared to TFTs made of amorphous silicon. It is further possible to drive the driving electrodes of the touch panel at a higher speed.

Since the InGaZnO-based oxide semiconductor etc. is processed at a lower cost as compared to polysilicon, it is possible to realize a high-performance touch panel at a low cost. Specifically, processing of polysilicon generally needs approximately 10 masks, whereas processing of the InGaZnO-based oxide semiconductor and amorphous silicon need 3 to 5 masks. Polysilicon requires laser annealing, whereas the InGaZnO-based oxide semiconductor does not require laser annealing, and it is therefore possible to easily increase a surface area.

Since the InGaZnO-based oxide semiconductor etc. has a wider band gap and a higher resistance to pressure than those of a silicon TFT, a high voltage can be utilized for the InGaZnO-based oxide semiconductor etc., and therefore performance of the touch panel can be improved. The InGaZnO-based oxide semiconductor has an excellent off-leak characteristic, and remarkably less leaks photocurrent than polysilicon and amorphous silicon.

The inventors of the present invention found that the TFTs made of the InGaZnO-based oxide semiconductor that is one kind of oxide semiconductors are turned on at an electric current approximately 20 times as large as an electric current at which the TFTs made of amorphous silicon are turned on. This allows the TFTs made of the InGaZnO-based oxide semiconductor to be reduced in surface area down to approximately ¼ as large as that of the TFTs made of amorphous silicon. It is therefore possible to provide the touch panel driving circuit 250 in a smaller region, i.e., it is possible to further narrow a frame region. The inventors of the present invention also found that an electric current which leaks while the TFTs made of the InGaZnO-based oxide semiconductor are in an off state is not more than 1 pA. Such a low leak current contributes to reduction in power consumption.

As will be later described in detail, in a case where a pixel driving circuit of a display device such as a liquid crystal display device is made up of the TFTs made of the InGaZnO-based oxide semiconductor, high-speed writing to the display device can be carried out, and the display device can be easily driven in synchronization with driving of a touch panel. This makes is possible to produce a touch panel which (i) is unlikely to be affected by noise that is generated by the display device and (ii) has an excellent characteristic.

FIG. 1 illustrates a case where the driving electrodes and the sensing electrodes are provided on an identical surface of the substrate 210 in each of which driving electrodes and sensing electrodes the plurality of rhombic electrodes are connected on the identical surface. The configuration of the driving electrodes and the sensing electrodes is not limited to the case. In each of the driving electrodes and the sensing electrodes, a plurality of rectangular electrodes may be connected, or a plurality of belt-shaped electrodes may be merely arranged in parallel. In this case, the driving electrodes and the sensing electrodes are provided so as to be orthogonal to each other and so as to be electrically insulated from each other. For example, a plurality of belt-shaped electrodes each extending in a longitudinal direction, and a plurality of belt-shaped electrodes each extending in a traverse direction are provided on respective front and back surfaces of a substrate 210. An electrode group provided on one of the front and back surfaces serves as driving electrodes for detection of a touched position, whereas an electrode group provided on the other of the front and back surfaces serves as sensing electrodes for detection of the touched position. That is, in this case, a touch panel includes the sensing electrodes and the driving electrodes provided on the respective front and back surfaces of the substrate 210.

(a) of FIG. 2 through (d) of FIG. 2 (later described in detail) also illustrate a case where sensing electrodes and driving electrodes are provided on an identical surface of a substrate. The sensing electrodes and the driving electrodes are not necessarily provided on the identical surface but may be provided on respective different surfaces of the substrate, as is the case with FIG. 1.

The following description will discuss an example where a liquid crystal display device is employed as a display device to be used together with the touch panel of the aspect of the present invention. The display device is not limited to the liquid crystal display device. The display device can be used together with an EL panel. Particularly, in a case where an EL display device is employed as the display device in which EL display device (i) a color filter of R, G and B is provided on an EL panel from which white light exits so that sub pixels are formed, and (ii) each of the sub pixels is driven, the EL display device can have a structure similar to that of the liquid crystal display device, the structure including a structure of the color filter. Alternatively, a plasma display device may be employed as the display device.

As has been described, FIG. 1 illustrates the example where the touch panel driving circuit 250 is the TFT circuit which is provided directly on the substrate 210. The touch panel driving circuit 250 is not limited to this example. That is, the touch panel driving circuit 250 may be provided on a substrate different from the substrate 210, e.g., on a TFT substrate on which a driving circuit etc. of a display device used together with the touch panel is provided (described later with reference to (d) of FIG. 2). In this case, the touch panel driving circuit 250 is provided in a frame region on the TFT substrate which frame region is adjacent to "a touch electrode region in which the driving electrodes and the sensing electrodes, each for detection of a touched position, are provided". According to the basic configuration illustrated in FIG. 1, the detection circuit is provided on the substrate 240. The detection circuit may be made up of the TFTs made of the InGaZnO-based oxide semiconductor on the substrate 210.

As such, a touch panel of the invention of the present application is configured to be a touch panel including: a substrate; sensing electrodes and driving electrodes, each for detection of a touched position, provided on an identical surface or different surfaces of the substrate; a touch panel driving circuit which drives the driving electrodes; and a touched position detecting circuit which detects the touched position upon receipt of a detection output from the sensing electrodes, the touch panel driving circuit being made up of TFTs made of an oxide semiconductor.

Examples of the present invention will be described below with reference to FIGS. 2 and 3. (a) of FIG. 2 through (d) of FIG. 2 illustrate respective Examples 1 through 4 of the present invention, and an example of a touch panel itself and examples of a touch panel integrated display device in which the touch panel is combined with a liquid crystal display device etc. (a) of FIG. 3 and (b) of FIG. 3 each illustrate a specific configuration example of a color filter substrate applicable to corresponding one of Examples 3 and 4 illustrated in respective (c) of FIG. 2 and (d) of FIG. 2.

Example 1

(a) of FIG. 2 illustrates a touch panel of Example 1 of the present invention. In (a) of FIG. 2, the reference numeral "200" represents a touch panel which can be used as a separate component, in other words, an out-cell touch panel to be integrated with a display cell of a display device.

(a) of FIG. 2 illustrates a cross-sectional view of the touch panel 200 taken along A-A' line of FIG. 1. The touch panel 200 includes (i) a substrate 210 made of glass etc., (ii) a plurality of sensing electrodes 230(*m*−1), 230(*m*) and 230 (*m*+1) provided on the substrate 210, and (iii) a touch panel driving circuit 250 provided on the substrate 210. Needless to say, a driving electrode group 220 is also provided on the substrate 210. However, (a) of FIG. 2 does not illustrate the driving electrode group 220.

In Example 1, the touch panel driving circuit 250 which supplies a driving voltage (signal) to the driving electrode group 220 is made up of TFTs made of an InGaZnO-based oxide semiconductor on the substrate 210. In a case where the touch panel is in practical use as the separate component, a transparent insulating film (cover glass) for use in protection is further provided on the touch panel driving circuit 250, driving electrodes (not illustrated in (a) of FIG. 2), and a sensing electrode group 230.

The out-cell touch panel used as the separate component further requires a step of producing the TFTs made of the InGaZnO-based oxide semiconductor, in addition to a step of producing the driving electrodes and the sensing electrodes of the touch panel with a transparent electrically-conductive film. On the other hand, the out-cell touch panel has an advantage of being a general-purpose touch panel which can be used together with various display devices.

For example, by being provided on a printed material where various functions have been printed, the touch panel can be employed as a touch switch for realizing the various functions. A remarkably general-purpose touch panel can be configured. Since the touch panel driving circuit 250 is made up of the TFTs made of the InGaZnO-based oxide semiconductor, it is possible to narrow a side part of a display section, i.e., a frame part. This less impairs appearance of the touch panel.

The driving electrode group 220 and the sensing electrode group 220 (not illustrated in (a) of FIG. 2) may be provided on a back surface side of the substrate 210, and then the back surface side may be provided so as to come into contact with a surface of a display device etc. In this case, the substrate 210 itself serves as a cover glass for use in protection. The substrate 210 which serves as the cover glass is touched with a finger etc. The touch panel is configured as a cover glass integrated touch panel. It is therefore unnecessary to provide a special cover glass. This can suppress rise in cost.

It is further possible to reduce the number of members, such as a separate touch panel and "paste" for use in bonding, and the number of steps such as a bonding step. This can realize a low cost. It is further possible to improve optical characteristics, e.g., to suppress increase in transmittance, and to reduce reflectivity of unnecessary external light, as compared to a cover glass provided with a touch panel which is obtained by combining a separate touch panel with a cover glass etc.

Example 2

(b) of FIG. 2 illustrates an example of (i) a touch panel of Example 2 of the present invention and (ii) a touch panel integrated display device in which the touch panel is combined with a liquid crystal display device. The touch panel of Example 2 is configured as a color filter integrated touch panel in which a color filter is integrated with the touch panel on a substrate on which the touch panel is provided, the color filter being incorporated in the display device such as the liquid crystal display device to allow the display device to carry out multicolor display. By being provided on the liquid crystal display device, this color filter integrated touch panel can be configured as a touch panel integrated liquid crystal display device. This color filter integrated touch panel can be called an on-cell touch panel. Note that, in Example 2, identical reference numerals are given to members identical to those of Example 1, and therefore, detailed description of such identical members is omitted.

In (b) of FIG. 2, the reference numeral "215" represents a color filter glass substrate (hereinafter referred to as a CF glass substrate). On the color filter glass substrate 215 provided are (i) the color filter which is incorporated in the display device to allow the display device to carry out the multicolor display and (ii) driving electrodes and sensing electrodes which are included in the touch panel. On one surface of the CF glass substrate 215 provided are a driving electrode group (not illustrated in (b) of FIG. 2) and a sensing electrode group 230, and a touch panel driving circuit 250 which are included in the touch panel. This configuration may be basically identical to that of Example 1 illustrated in (a) of FIG. 2. On the other surface of the CF glass substrate 215 provided is the color filter (not particularly illustrated) which is incorporated in the display device such as the liquid crystal display device to allow the display device to carry out the multicolor display.

A counter transparent electrode 260 of the liquid crystal display device is further provided on the other surface of the CF glass substrate 215 on which the color filter is provided (on a surface on which the driving electrodes and the sensing electrodes which are included in the touch panel are not provided). The color filter integrated touch panel is combined with a TFT glass substrate 310 on which pixel electrodes, TFTs for driving pixels, and the like are provided, so that a touch panel integrated display device can be configured.

That is, the CF glass substrate 215 integrated with the touch panel and the color filter is provided so as to face the TFT glass substrate 310 via a minute space. The minute space is filled with liquid crystal so that a liquid crystal layer 320 is formed. This completes a touch panel integrated liquid crystal display device 300 (see (b) of FIG. 2). According to an example illustrated in (b) of FIG. 2, the sensing electrodes, the driving electrodes, and the touch panel driving circuit, each for detection of a touched position, are provided on a surface of a substrate 210 which surface is on a viewer side.

According to Example 2, for the CF glass substrate 215, it is necessary to add a step of producing TFTs made of an InGaZnO-based oxide semiconductor, in addition to a step of producing the driving electrodes and the sensing electrodes of the touch panel with a transparent electrically-conductive film. It is further necessary to provide the counter transparent electrode 260 on a back surface side of the CF glass substrate 215. On the other hand, no substrate is required only for the touch panel, and the touch panel integrated with the color filter is obtained. Therefore, the touch panel integrated liquid crystal display device can be remarkably compact.

It is further possible to reduce the number of members, such as a separate touch panel and "paste" for use in bonding, and the number of steps such as a bonding step. This can realize a low cost. It is further possible to improve optical characteristics, e.g., to suppress increase in transmittance, and to reduce reflectivity of unnecessary external light, as compared to a display device provided with a touch panel in which display device a separate touch panel is combined with a display device etc.

Example 3

(c) of FIG. 2 illustrates an example of (i) a touch panel of Example 3 of the present invention and (ii) a touch panel integrated display device in which the touch panel is combined with a liquid crystal display device.

Similar to the touch panel of Example 2, the touch panel of Example 3 is configured as a color filter integrated touch panel in which a color filter is integrated with the touch panel on a substrate on which the touch panel is provided, the color filter being incorporated in the display device such as the liquid crystal display device to allow the display device to carry out multicolor display. Note that, in Example 3, identical reference numerals are given to members identical to those of Examples 1 and 2, and therefore, detailed description of such identical members is omitted.

As illustrated in (c) of FIG. 2, a sensing electrode group 230 and a touch panel driving circuit 250 which are included in the touch panel are provided on one surface of a CF glass substrate 215. A color filter (not illustrated in (c) of FIG. 2) is further provided on the one surface of the CF glass substrate 215. A detailed configuration of the CF glass substrate 215 including the color filter will be described later with reference to FIG. 3.

The color filter integrated touch panel illustrated in (c) of FIG. 2 is an in-cell touch panel in which (i) the electrode group and the touch panel driving circuit 250 which are included in the touch panel are provided on the one surface of the CF glass substrate 215, (ii) the color filter is further provided, and then (iii) a counter transparent electrode 260 is provided.

The color filter integrated touch panel is combined with a TFT glass substrate 310 on which pixel electrodes, TFTs for driving pixels, and the like are provided, so that a touch panel integrated display device 300 can be configured. That is, the CF glass substrate 215 integrated with the touch panel and the color filter is provided so as to face the TFT glass substrate 310 via a minute space. The minute space is filled with liquid crystal so that a liquid crystal layer 320 is formed. This completes a touch panel integrated liquid crystal display device 300 (see (c) of FIG. 2).

The color filter integrated touch panel illustrated in (c) of FIG. 2 is configured so that (i) the electrode group and the touch panel driving circuit 250 which are included in the touch panel are provided on the one surface of the CF glass substrate 215, and (ii) the counter transparent electrode 260 is further provided. Therefore, TFTs need to be provided only on the one surface of the CF glass substrate 215. Note that, according to Example 3 illustrated in (c) of FIG. 2, sensing electrodes, driving electrodes, and the touch panel driving circuit, each for detection of a touched position, are provided on the one surface of the CF glass substrate 215 which one surface is opposite to the other surface of the CF glass substrate 215 which other surface faces a viewer.

Example 4

(d) of FIG. 2 illustrates Example 4 of the present invention, and an example of a touch panel integrated liquid crystal display device in which a touch panel is combined with a liquid crystal display device. Note that, in Example 4, identical reference numerals are given to members identical to those of Examples 1, 2 and 3, and therefore, detailed description of such identical members is omitted.

The touch panel integrated liquid crystal display device of Example 4 illustrated in (d) of FIG. 2 is substantially identical to the color filter integrated touch panel of Example 3 illustrated in (c) of FIG. 2 in terms of (i) a configuration of a color filter and (ii) a configuration of a touch electrode region where a driving electrode group 220 and a sensing electrode group 230 are provided. The touch panel of Example 4 is an in-cell touch panel. On the other hand, the touch panel integrated liquid crystal display device of Example 4 is different from the color filter integrated touch panel of Example 3 in terms of a location where a touch panel driving circuit 250 is provided.

The touch panel integrated liquid crystal display device of Example 4 is configured so that a touch panel driving circuit 250 is provided on a TFT glass substrate 310 in a side part outside of a display region of the liquid crystal display device (see (d) of FIG. 2). That is, the touch panel driving circuit 250 is provided on the TFT glass substrate 310 on which pixel electrodes, a pixel driving circuit and the like of the liquid crystal display device are provided. This allows TFTs of the liquid crystal display device and TFTs of the touch panel driving circuit 250 to be simultaneously provided. It is therefore possible to provide the touch panel driving circuit 250 without specially increasing cost. Though no detailed description is given, it is clear that the TFTs of the liquid crystal display device are preferably made of an InGaZnO-based oxide semiconductor.

The touch panel driving circuit 250 is connected via a contact region 350 to driving electrodes of the touch panel. Specifically, contact pads are provided on a portion of the TFT glass substrate 310 and a portion of a CF glass substrate 215 which portion corresponds to the portion of the TFT glass substrate 310, respectively. The contact pads are connected to each other via an electrically-conductive material.

In a case where the touch panel integrated liquid crystal display device is assembled, the CF glass substrate 215 on which a color filter integrated touch panel is provided is bonded to the TFT glass substrate 310 with a sealing material via a minute space. It is possible to easily attain electrical connection by using a sealing material that contains gold beads etc. The minute space is filled with liquid crystal so that a liquid crystal layer 320 is formed.

As such, according to Example 4 illustrated in (d) of FIG. 2, a color filter which allows the display device to carry out multicolor display, and a counter common electrode 260 for driving pixels of the display device are provided for the CF glass substrate 215. Further, the touch panel driving circuit 250 is provided on the TFT substrate 310 made of glass etc. on which TFT substrate 310 pixel driving electrodes of the display device are provided.

The above has described an example where a liquid crystal display device is employed as a display device. The display device is not limited to the liquid crystal display device. It goes without saying that the display device may be, for example, an EL display device which emits white light from a whole surface and carries out multicolor display with a color filter.

(Configuration Example of CF Glass Substrate)

The following description will discuss, with reference to FIG. 3, specific configuration examples of the CF glass substrates 215 of (c) of FIG. 2 and (d) of FIG. 2.

(a) of FIG. 3 and (b) of FIG. 3 each illustrate a configuration of a liquid crystal display device 300 integrated with a touch panel. Each of (a) of FIG. 3 and (b) of FIG. 3 can also be understood as a diagram which illustrates a partial configuration of a "color filter integrated touch panel" in which a "color filter incorporated in a display device such as a liquid crystal display device" is integrated with "driving electrodes, sensing electrodes and the like of a touch panel". Note that, in (a) of FIG. 3 and (b) of FIG. 3, identical reference numerals are given to components identical to those of Examples 1 through 4 illustrated in (a) of FIG. 2 through (d) of FIG. 2, and therefore, detailed description of such identical components is omitted.

As illustrated in (a) of FIG. 3, a metallic mesh 280 is provided on a CF glass substrate 215. Further, driving electrodes 220(*n*−1) and 220(*n*) of and a sensing electrode 230(*m*) of the touch panel are provided via an electrically-insulating material 270 on the CF glass substrate 215. The metallic mesh 280 is electrically connected to the sensing electrode 230(*m*), and serves as a shield which prevents external noise from entering the sensing electrode 230(*m*). The metallic mesh 280 also serves as a BM (Black Matrix). Thanks to these, low resistance of the sensing electrode is attained without increase in the number of steps.

A color filter 290 of R, G and B is provided via an electrically-insulating layer 271. A color filter is not limited to the color filter of R, G and B, but may be, for example, a color filter of R, G, B and W (white). On the color filter 290 provided is a counter transparent electrode 260. This completes a color filter integrated touch panel.

The CF glass substrate 215, for which the driving electrodes and the sensing electrode of the touch panel, the color filter and the like are provided, is provided so as to face a TFT glass substrate 310 via a minute space. The minute space is filled with liquid crystal so that a liquid crystal layer 320 is formed. Further, a polarizing plate 340, a cover glass and the like are provided. This completes a "touch panel integrated liquid crystal display device".

The liquid crystal display device illustrated in (a) of FIG. 3 is configured so that the color filter 290 is sandwiched between the sensing electrode 230(*m*) of the touch panel and the TFT glass substrate 310 on which pixel electrodes, a pixel driving circuit and the like of the liquid crystal display device are provided. Therefore, the sensing electrode 230(*m*) of the touch panel is far from a main body section of the liquid crystal display device by a thickness of the color filter 290, as compared to a case of a liquid crystal display device (later described) illustrated in (b) of FIG. 3. This brings about an effect that the sensing electrode 230(*m*) of the touch panel is unlikely to be affected by noise from a liquid crystal display device side. This also brings about effects of (i) reducing parasitic capacitance formed by the counter transparent electrode 260 of the liquid crystal display device and the electrodes of the touch panel, (ii) improving an SNR (Signal Noise Ratio) and an operational frequency of the touch panel, and (iii) attaining low power consumption.

A liquid crystal display device 300 illustrated in (b) of FIG. 3 is substantially identical in configuration to the liquid crystal display device illustrated in (a) of FIG. 3 except for a location where a color filter 290 is provided.

The liquid crystal display device 300 illustrated in (b) of FIG. 3 is configured so that (i) a color filter 290 is provided on a CF glass substrate 215, (ii) driving electrodes 220(*n*−1) and 220(*n*) of and a sensing electrode 230(*m*) of the touch panel are provided on the color filter 290, (iii) a metallic mesh 280 is further provided via an electrically-insulating layer 270, and then (iv) a counter transparent electrode 260 is provided via an electrically-insulating layer 271. The metallic mesh 280 is electrically connected to the sensing electrode 230(*m*) via a through-hole. The metallic mesh 280 is also electrically connected to the counter transparent electrode 260 via a through-hole.

(b) of FIG. 3 is identical to (a) of FIG. 3 in that (i) the CF glass substrate 215, for which the driving electrodes and the sensing electrode of the touch panel, and the color filter are provided, is provided so as to face a TFT glass substrate 310 via a minute space, (ii) the minute space is filled with liquid crystal so that a liquid crystal layer 320 is formed, and (iii) a polarizing plate 340, a cover glass and the like are provided, whereby a "touch panel integrated liquid crystal display device" is completed.

The liquid crystal display device illustrated in (b) of FIG. 3 is configured so that the metallic mesh 280 is provided between the sensing electrode 230(*m*) of the touch panel and the TFT glass substrate 310 on which pixel electrodes, a pixel driving circuit and the like of the liquid crystal display device are provided. This configuration brings about an effect that the sensing electrode 230(*m*) is unlikely to be affected by noise from a liquid crystal display device side. When viewed from a viewer side, the liquid crystal display device is not configured so that the driving electrodes, the sensing electrode and the like of the touch panel are present between the color filter 290 and a viewer, but the liquid crystal display device is configured so that only minimum necessary components such as the polarizing plate 340 etc. are present between the color filter 290 and the viewer. Therefore, the liquid crystal display device can carry out a clear multicolor display derived from an original color of the color filter.

It is further possible to reduce resistance of the counter transparent electrode and generation of noise from a display device, and to prevent driving of the touch panel from adversely affecting display quality. In a case where, as illustrated in (a) of FIG. 3, the metallic mesh 280 also serves as the BM (Black Matrix), the polarizing plate 340 should be a circularly-polarizing plate to prevent external light from being reflected by the metallic mesh 280. However, the configuration illustrated in (b) of FIG. 3 makes it possible to use a linearly-polarizing plate which is more easily produced and cheaper than the circularly-polarizing plate. It is therefore possible to attain a low reflectivity at low cost.

(Specific Example of Touch Panel Driving Circuit)

Specific examples of touch panel driving circuits will be described with reference to FIGS. 4 and 5. A comparison is made between the touch panel driving circuits illustrated in FIGS. 4 and 5 with reference to FIG. 6. The following description will mainly discuss a configuration of a touch panel driving circuit 250. It is clear that driving carried out by the touch panel driving circuit 250 can be understood as it is as an invention of a method of driving a touch panel.

(Example of Sequential Driving Circuit)

Figure 4:
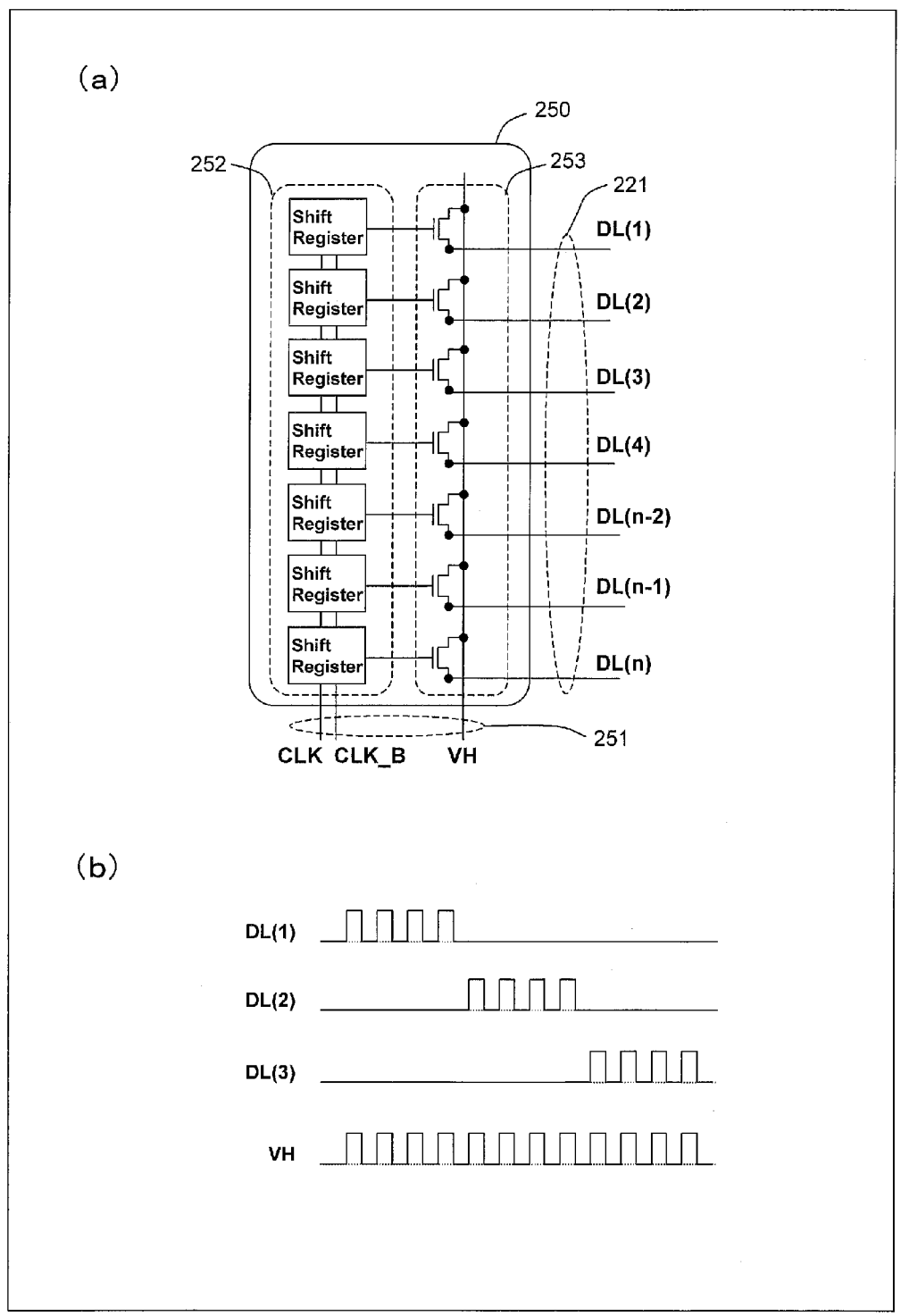
FIG. 4 is a diagram illustrating a configuration example of a touch panel driving circuit which drives the touch panel of the aspect of the present invention according to a sequential driving method.

(a) of FIG. 4 illustrates an example of a sequential driving circuit which carries out sequential driving of a touch panel. (b) of FIG. 4 is a timing chart of the sequential driving circuit illustrated in (a) of FIG. 4. In (a) of FIG. 4, a region enclosed by a frame 250 corresponds to a circuit section described as the touch panel driving circuit 250 in FIGS. 1 and 2, and corresponds to a circuit section made up of TFTs made of an InGaZnO-based oxide semiconductor.

A touch panel driving circuit 250 (illustrated in (a) of FIG. 4) which carries out sequential driving includes a shift register group 252 of a plurality of shift registers, and a switching circuit section 253. The touch panel driving circuit 250 outputs outward a touch panel driving voltage via a connection line group 221. In FIG. 4, DL(1) through DL(n) represent respective drive lines. The drive lines DL(1) through DL(n) are supply lines via which a driving voltage is supplied to driving electrodes of the touch panel. The drive lines DL(1) through DL(n) are connected to the connection line group 221.

Figure 15:
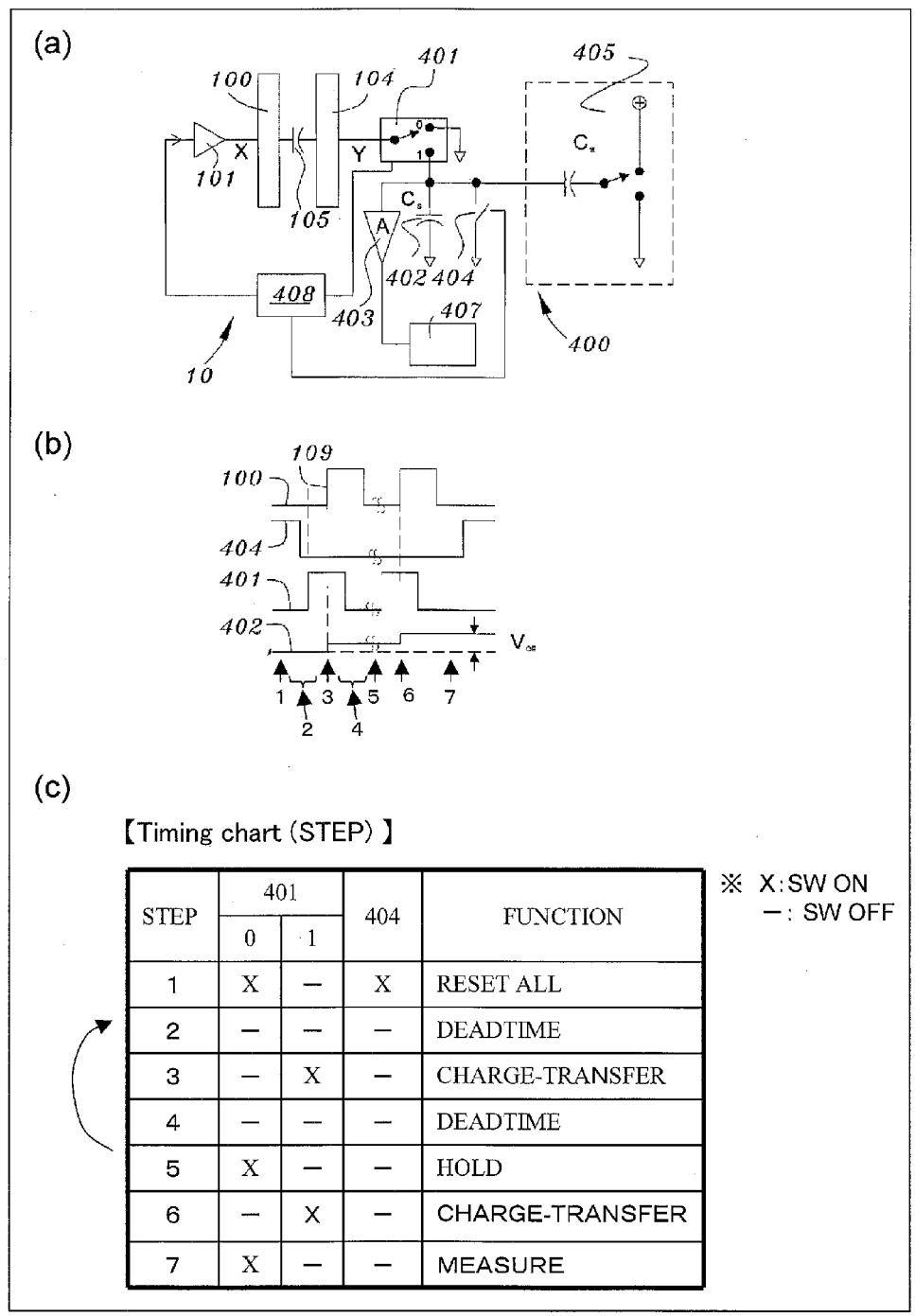
FIG. 15 is an explanatory view explaining a driving circuit of the electrostatic induction touch panel.
Figure 16:
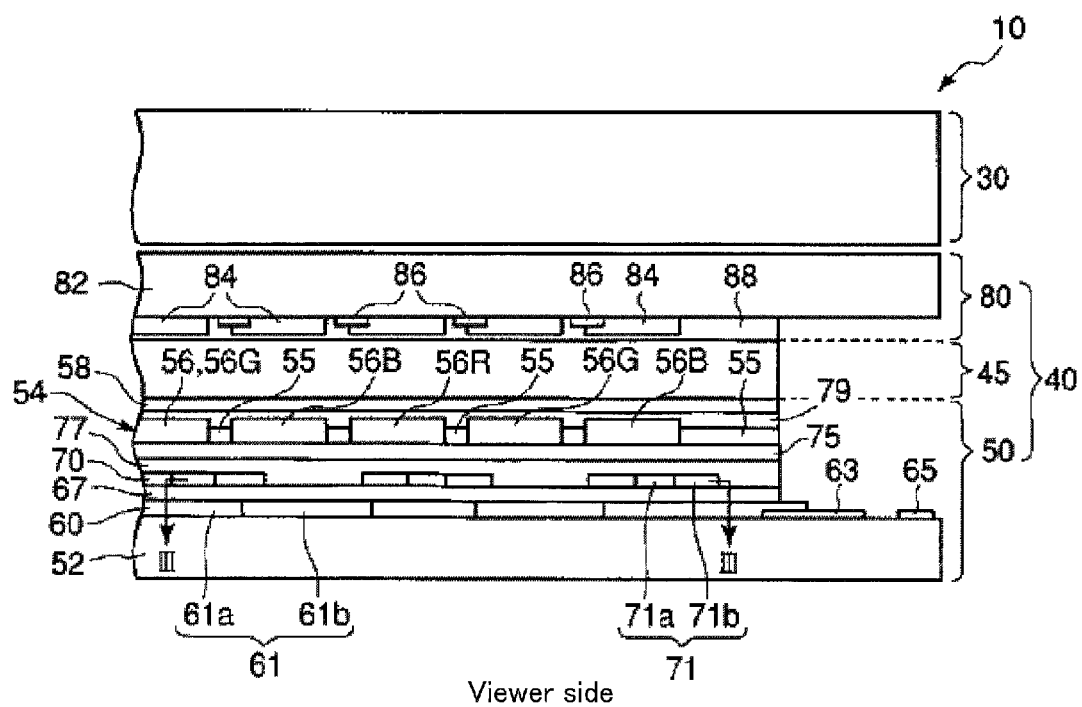
FIG. 16 is an explanatory diagram explaining a conventional in-cell touch panel.

A driving circuit itself which carries out sequential driving is publicly known as a conventional technique, and has been already described briefly with reference to FIG. 15. Therefore, detailed description thereof is omitted here. The shift register group 252 sequentially supplies a touch panel driving rectangular wave VH to the drive lines DL(1) through DL(n) at timing of the timing chart illustrated in (b) of FIG. 4, so that the driving electrodes of the touch panel are sequentially driven.

In a case where the touch panel driving circuit 250 is made up of TFTs made of an InGaZnO-based oxide semiconductor according to an aspect of the present invention, the touch panel driving circuit 250 can be made up of TFTs having an excellent characteristic and a small surface area (as has been described with reference to FIG. 1). In the case, it is further possible to apply a higher voltage to the TFTs made of the InGaZnO-based oxide semiconductor than a voltage to be applied to TFTs made of amorphous silicon. It is therefore possible to utilize a high voltage for driving of liquid crystal. This makes it easy to reduce cost of the touch panel driving circuit 250. This also makes it possible to increase a surface area of the touch panel driving circuit 250 in which the TFTs have the small surface area.

A driving voltage is sequentially applied via the drive lines DL(1) through DL(n) to the driving electrodes of the touch panel, so that the driving electrodes are sequentially driven. In this case, the number of connection lines in the connection line group 221 for connection of the driving electrodes should equal to the number of the drive lines DL. However, a connection line group 251 which connects a control circuit section to the touch panel driving circuit 250 needs only to include three connection lines. This allows increase in region for a line section. It is therefore possible to remarkably suppress increase in resistance of the line section.

That is, in a case where the touch panel driving circuit 250 made up of the TFTs made of the InGaZnO-based oxide semiconductor is provided in a frame part, (i) it is unnecessary to increase the number of the connection lines in the connection line group 251 even if the touch panel has a larger surface area, and (ii) the touch panel driving circuit 250 itself can have a small surface area. This allows the frame part to be still narrow.

(Example of Parallel Driving Circuit)

Figure 5:
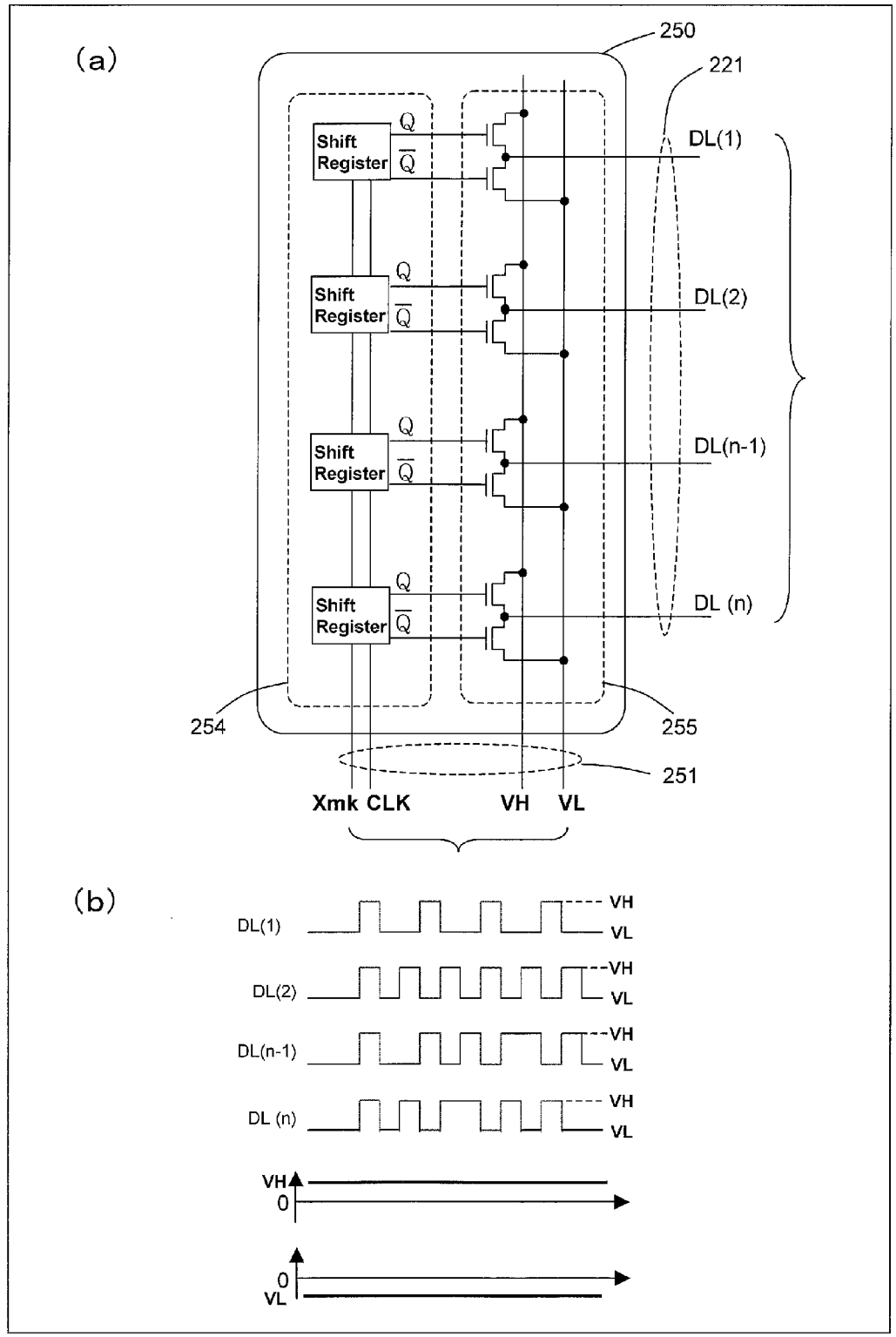
FIG. 5 is a diagram illustrating a configuration example of a touch panel driving circuit which drives the touch panel of the aspect of the present invention according to a parallel driving method.

(a) of FIG. 5 illustrates an example of a parallel driving circuit which carries out parallel driving of a touch panel. (b) of FIG. 5 is a timing chart of the parallel driving circuit illustrated in (a) of FIG. 5. In (a) of FIG. 5, a region enclosed by a frame 250 corresponds to the circuit section described as the touch panel driving circuit 250 in FIGS. 1 and 2, and corresponds to a circuit section made up of TFTs made of an InGaZnO-based oxide semiconductor.

A touch panel driving circuit 250 (illustrated in (a) of FIG. 5) which carries out parallel driving includes a shift register group 254 of a plurality of shift registers, and a switching circuit section 255. The touch panel driving circuit 250 outputs outward a touch panel driving voltage via a connection line group 221. In FIG. 5, similar to FIG. 4, DL(1) through DL(n) represent respective drive lines. The drive lines DL(1) through DL(n) are supply lines via which a driving voltage is supplied to driving electrodes of the touch panel. The drive lines DL(1) through DL(n) are connected to the connection line group 221.

Figure 17:
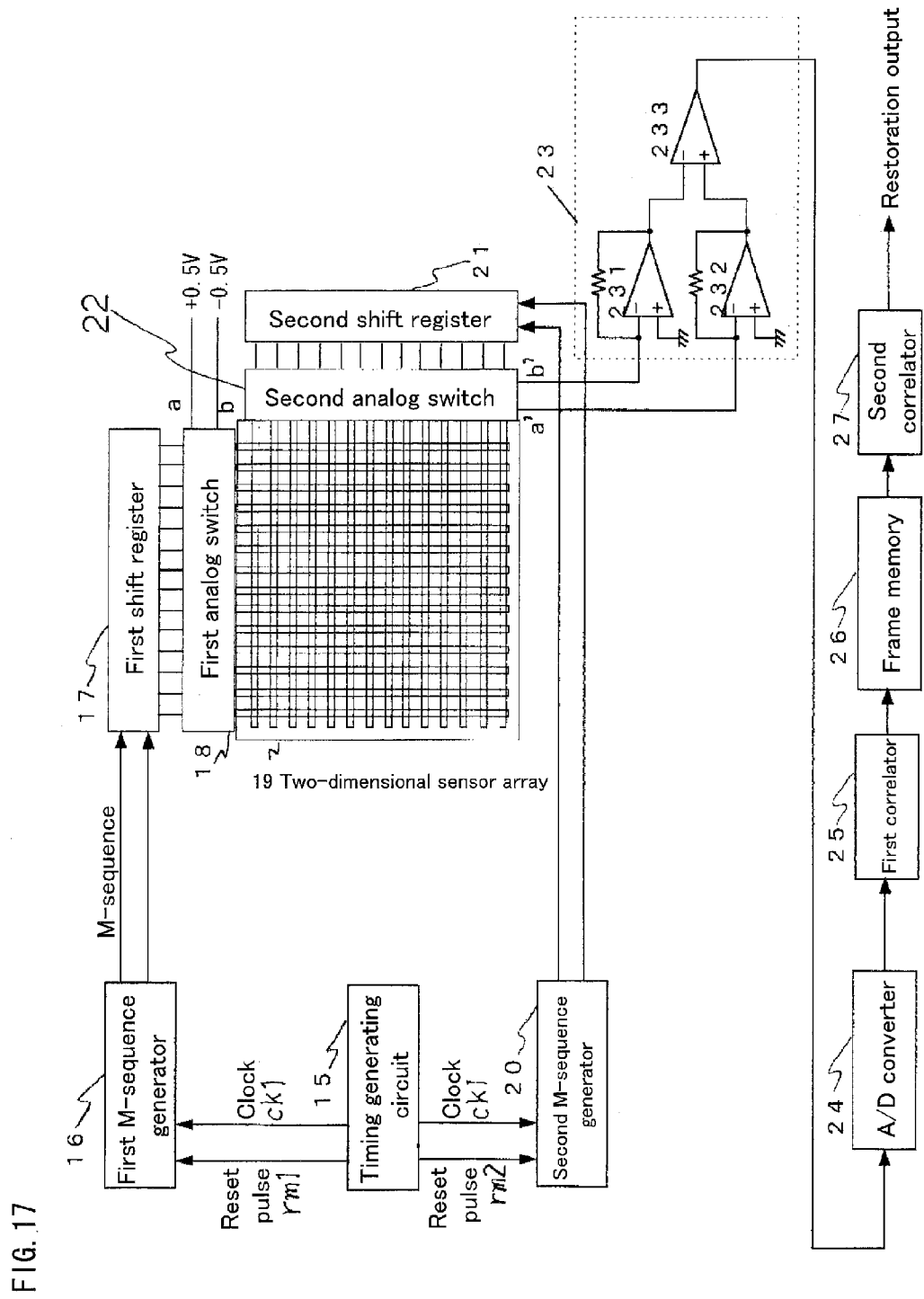
FIG. 17 is a diagram illustrating an example of a parallel driving circuit.
Figure 18:
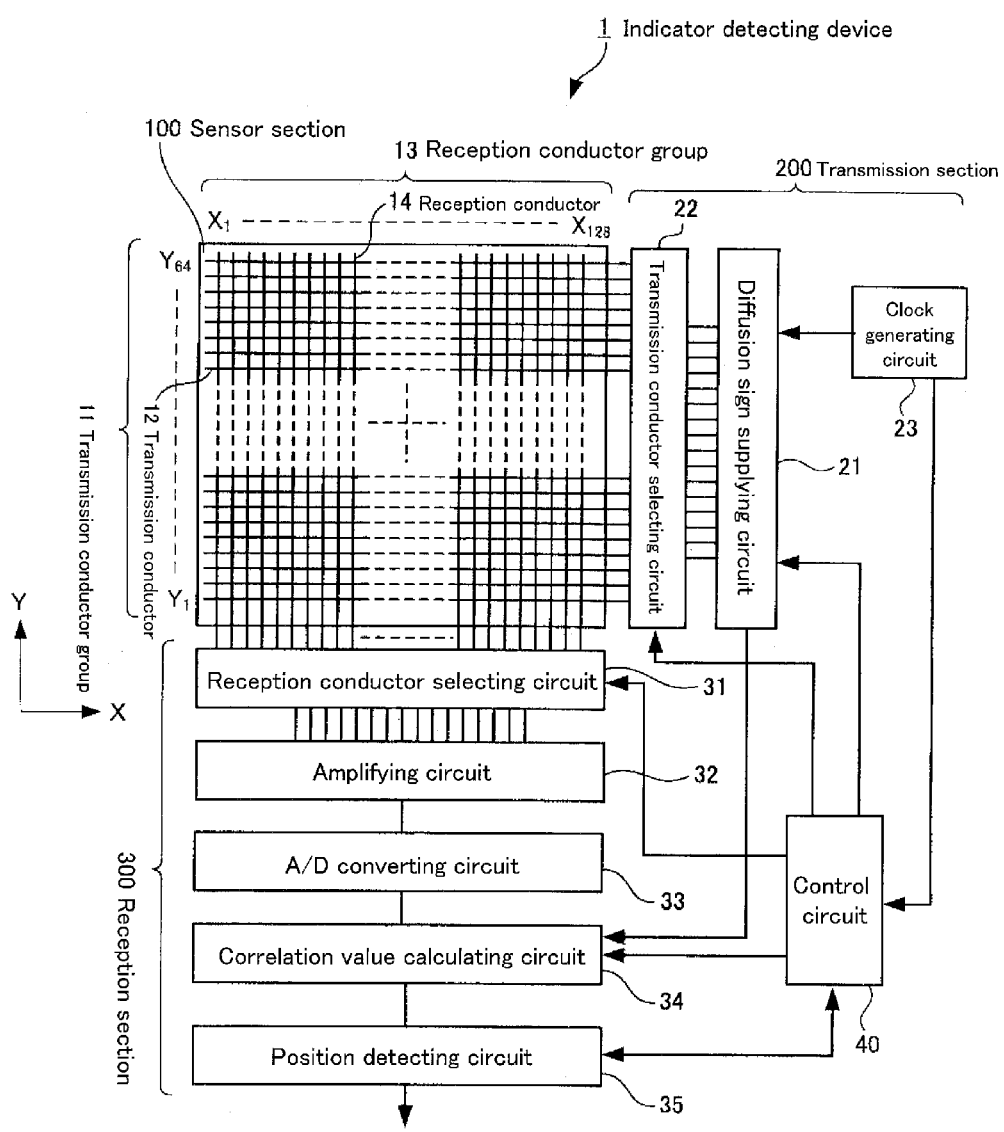
FIG. 18 is a diagram illustrating another example of the parallel driving circuit.
Figure 19:
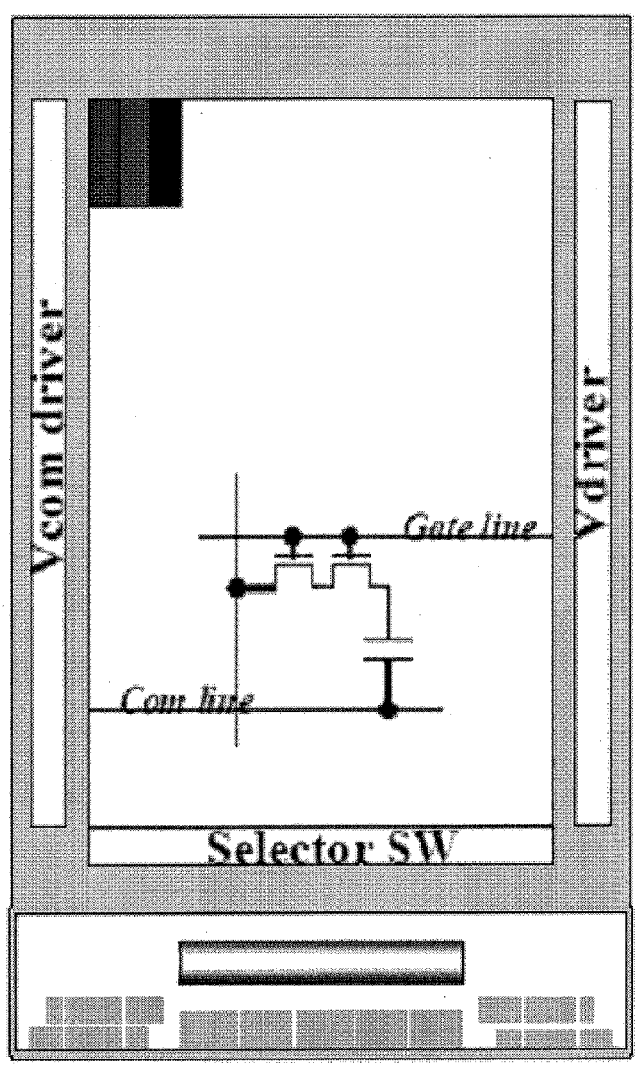
FIG. 19 is a diagram illustrating a configuration of a conventional semi in-cell touch panel.
Figure 20:
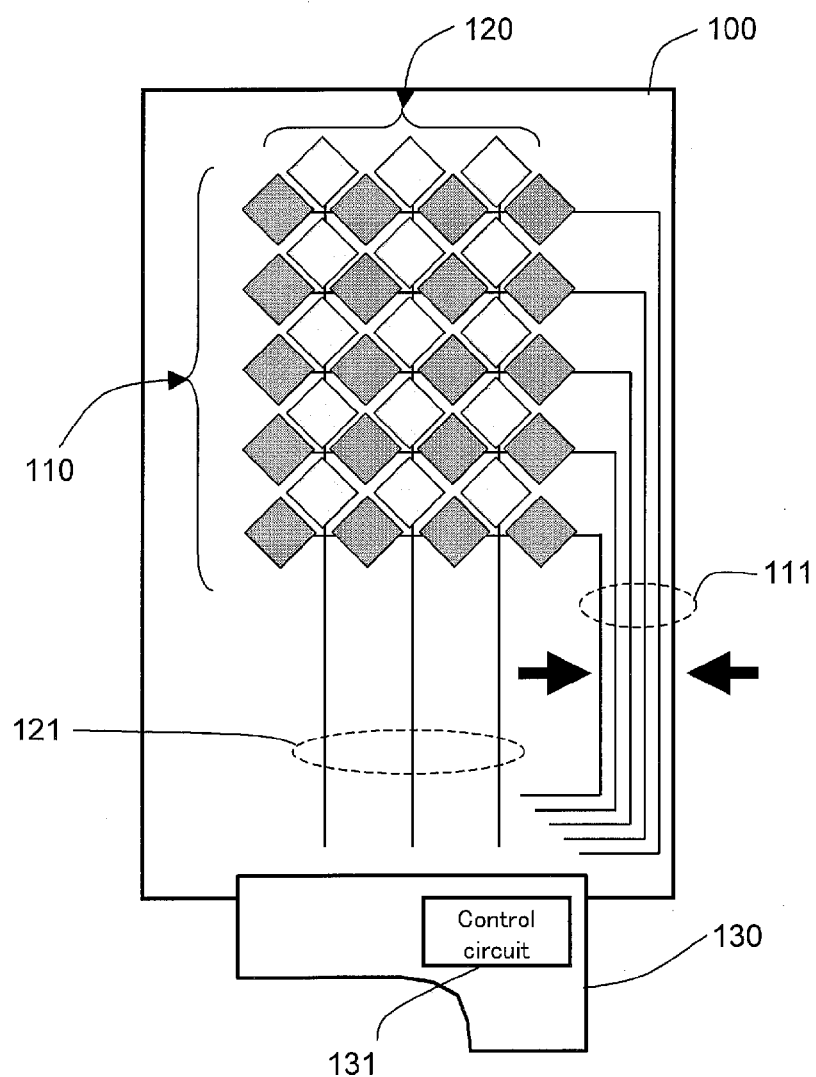
FIG. 20 is an explanatory diagram explaining one problem with a conventional touch panel.

A driving circuit itself which carries out parallel driving is publicly known as a conventional technique, and has been already described briefly with reference to FIGS. 17 and 18. Therefore, detailed description thereof is omitted here. As illustrated in (b) of FIG. 5, touch panel driving voltages VH and VL have an encoded pattern for each of the drive lines DL(1) through DL(n). The shift register group 254 and the switching circuit section 255 output the touch panel driving voltages VH and VL as a voltage to be applied. Voltages to be applied, each having a corresponding encoded pattern, are simultaneously (concurrently) applied to the respective driving electrodes of the touch panel. Note that an encoded pattern may be, for example, an M-sequence encoded pattern described in Patent Literature 3, or an Hadamard sign described in Patent Literature 4.

(Comparison Between Sequential Driving and Parallel Driving)

Figure 6:
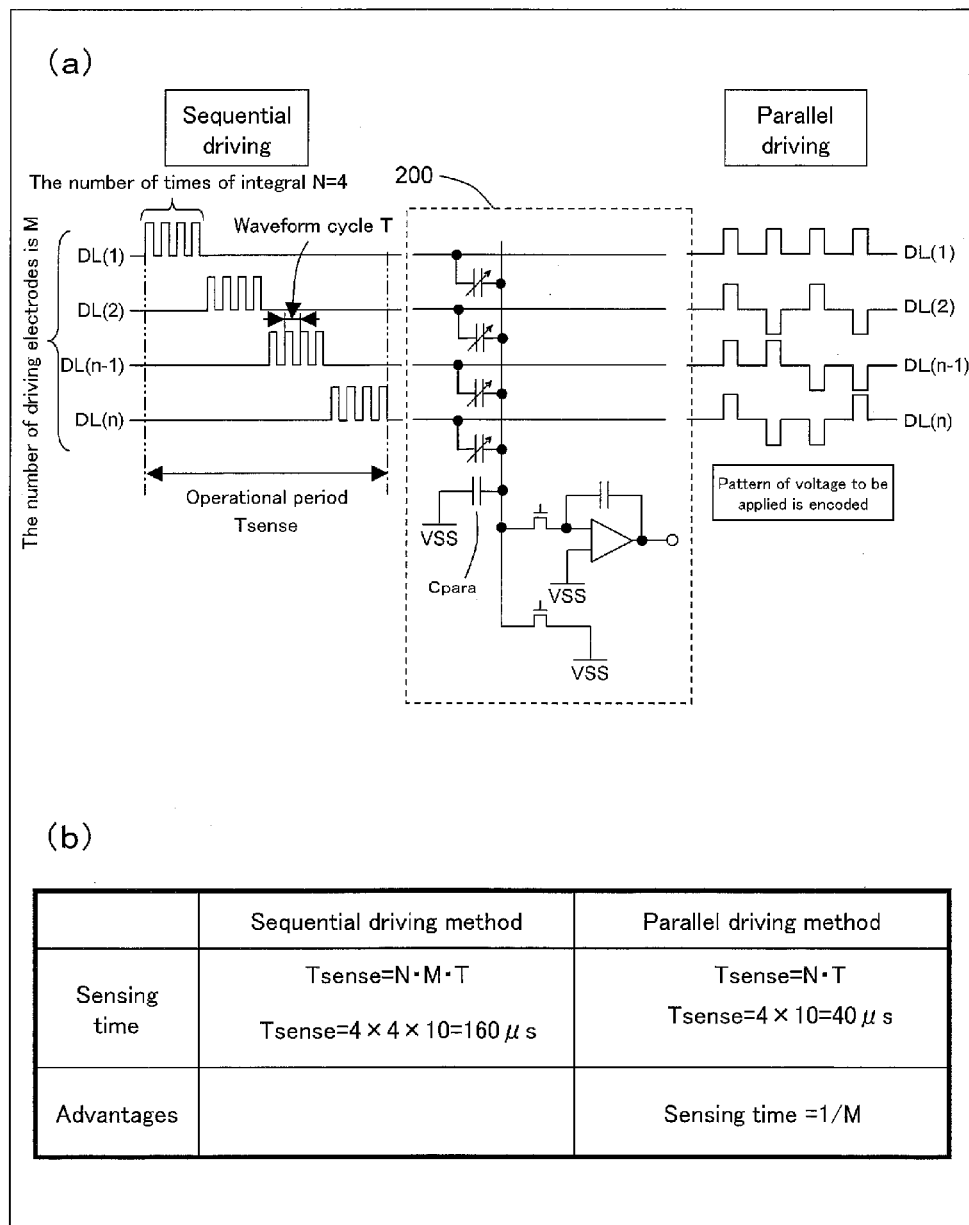
FIG. 6 is an explanatory diagram explaining advantages and disadvantages of the sequential driving method and the parallel driving method.

FIG. 6 is a table showing a result obtained by comparing sequential driving with parallel driving. (a) of FIG. 6 illustrates (i) a touch panel driving circuit simplified so that a sequential driving method and a parallel driving method are easily compared with each other, and (ii) a sequential driving pulse and a parallel driving pulse. In (a) of FIG. 6, (i) the sequential driving pulse is illustrated on the left side, (ii) the parallel driving pulse is illustrated on the right side, and (iii) a detection circuit 200 of a touch panel is simplistically illustrated in the center. (b) of FIG. 6 shows the result of the comparison.

As illustrated in (a) of FIG. 6, according to the sequential driving, a driving voltage is sequentially applied to the driving electrodes, whereas, according to the parallel driving, driving voltages, each having a corresponding encoded pattern, are concurrently applied to the respective driving electrodes (as has been already described with reference to FIGS. 4 and 5).

Assume that (i) the number of times of integral for a capacitor (capacitor Cpara in the detection circuit 200) for use in detection of a touch is 4 (N=4), (ii) a waveform cycle T of a driving waveform is 0.01 ms (=10 μm), and (iii) the number of driving electrodes is 4 (M=4). In this case, (1) a time required for sensing (a sensing time Tsens) of the sequential driving method is found that Tsense=4×4×10 μs=160 μs, and (2) a sensing time Tsense of the parallel driving method is found that Tsense=4×10 μs=40 μs. In the case where the number M of driving electrodes is 4, the sensing time Tsense of the parallel driving method which simultaneously applies parallel driving pulses to the four driving electrodes is, as a matter of course, "1/M" of the sensing time Tsense of the sequential driving method which sequentially applies a sequential driving pulse to the four driving electrodes.

As such, the parallel driving method can remarkably shorten a driving time for sensing of a touched position without reducing the number of times of integral. This makes it possible to carry out various kinds of driving. On the other hand, in a case where the sensing time of the parallel driving method is constant, the parallel driving method can increase the number of times of integral to M times as large as the number of times of integral, and can increase an SNR to $\sqrt{M}$ times as large as the SNR.

(Specific Example of Touch Panel Driving)

The following description will discuss further specific driving examples of a touch panel with reference to FIGS. 7 through 13. These driving examples are carried out in synchronization with driving of a display device to be integrated with the touch panel. FIGS. 7 through 13 illustrate an example where a liquid crystal display device is employed as the display device. The display device is not limited to the liquid crystal display device, but may be an EL display device. Particularly a color filter integrated touch panel is suitably applicable to an EL display device which carries out multicolor display by (i) emitting white light from a whole surface, (ii) providing a color filter of, e.g., R, G and B so that sub pixels are formed, and (iii) carrying out driving for each of the sub pixels.

The following description will mainly discuss a configuration of a touch panel driving circuit 250. Driving carried out by the touch panel driving circuit 250 can be understood as it is as an invention of a driving method synchronized with a vertical synchronization signal of the display device (a driving method which carries out 1V synchronization driving). The driving can further be understood as an invention of a driving method synchronized with a horizontal synchronization signal of the display device (a driving method which carries out 1H synchronization driving).

Figure 11:
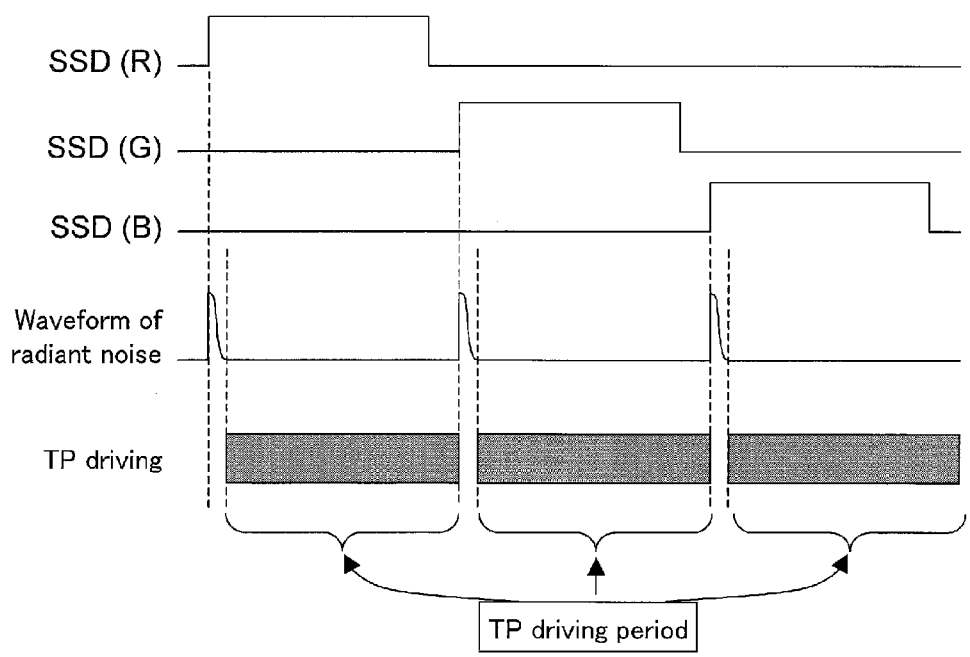
FIG. 11 is an explanatory diagram explaining a fifth example where the touch panel of the aspect of the present invention is driven in synchronization with the driving of the display device integrated with the touch panel.
Figure 12:
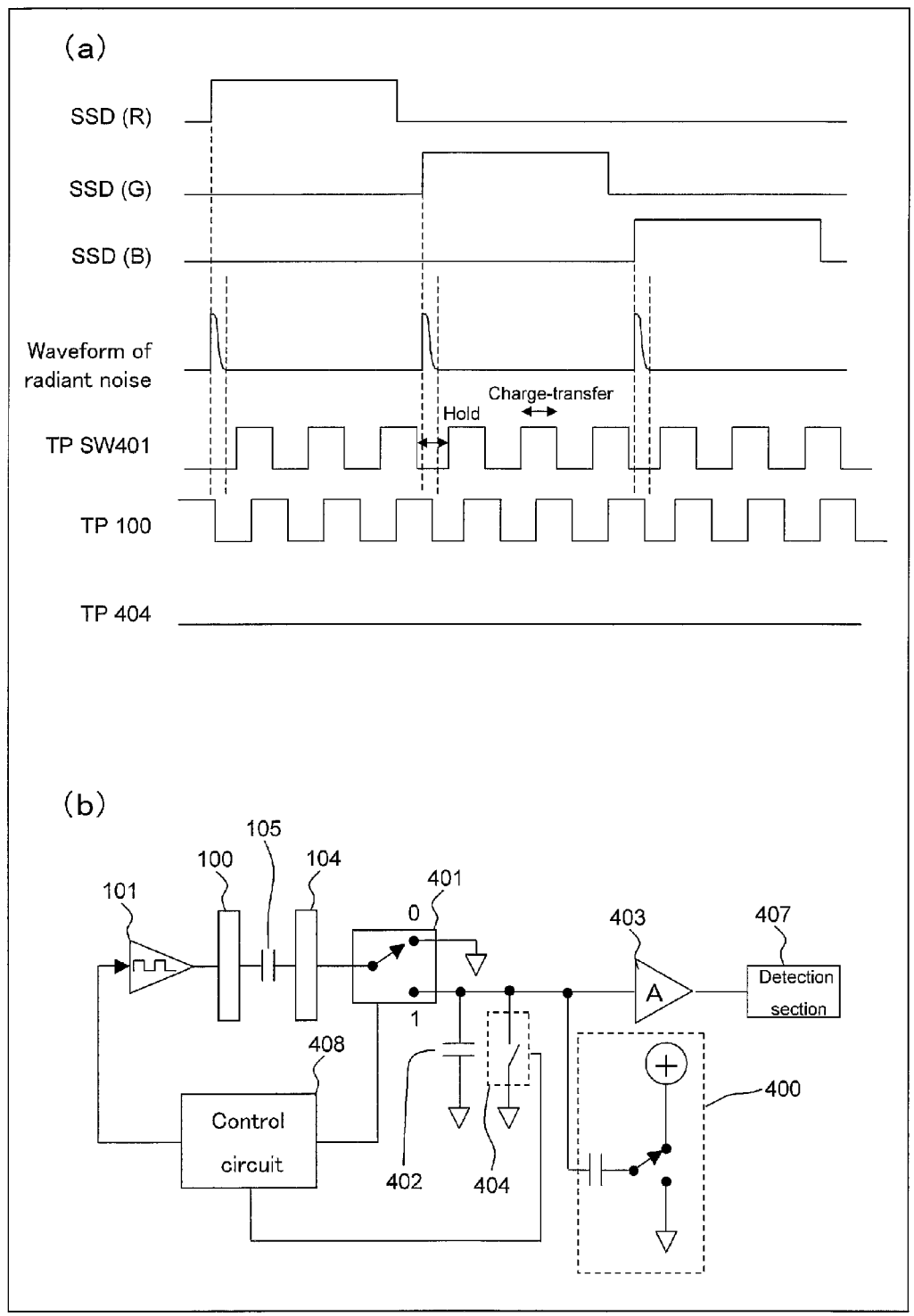
FIG. 12 is an explanatory diagram explaining a sixth example where the touch panel of the aspect of the present invention is driven in synchronization with the driving of the display device integrated with the touch panel.
Figure 13:
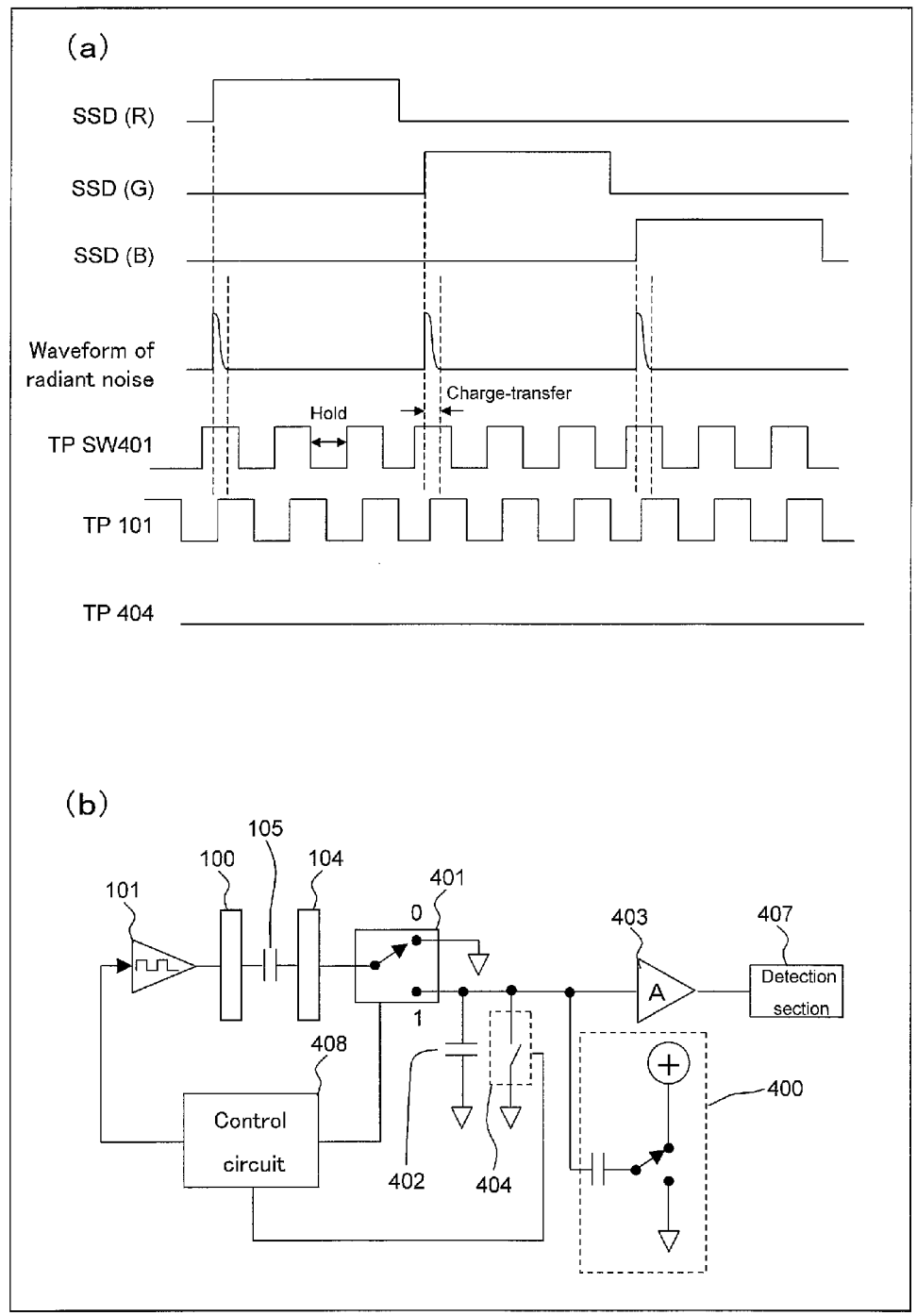
FIG. 13 is an explanatory diagram explaining a seventh example where the touch panel of the aspect of the present invention is driven in synchronization with the driving of the display device integrated with the touch panel.
Figure 14:
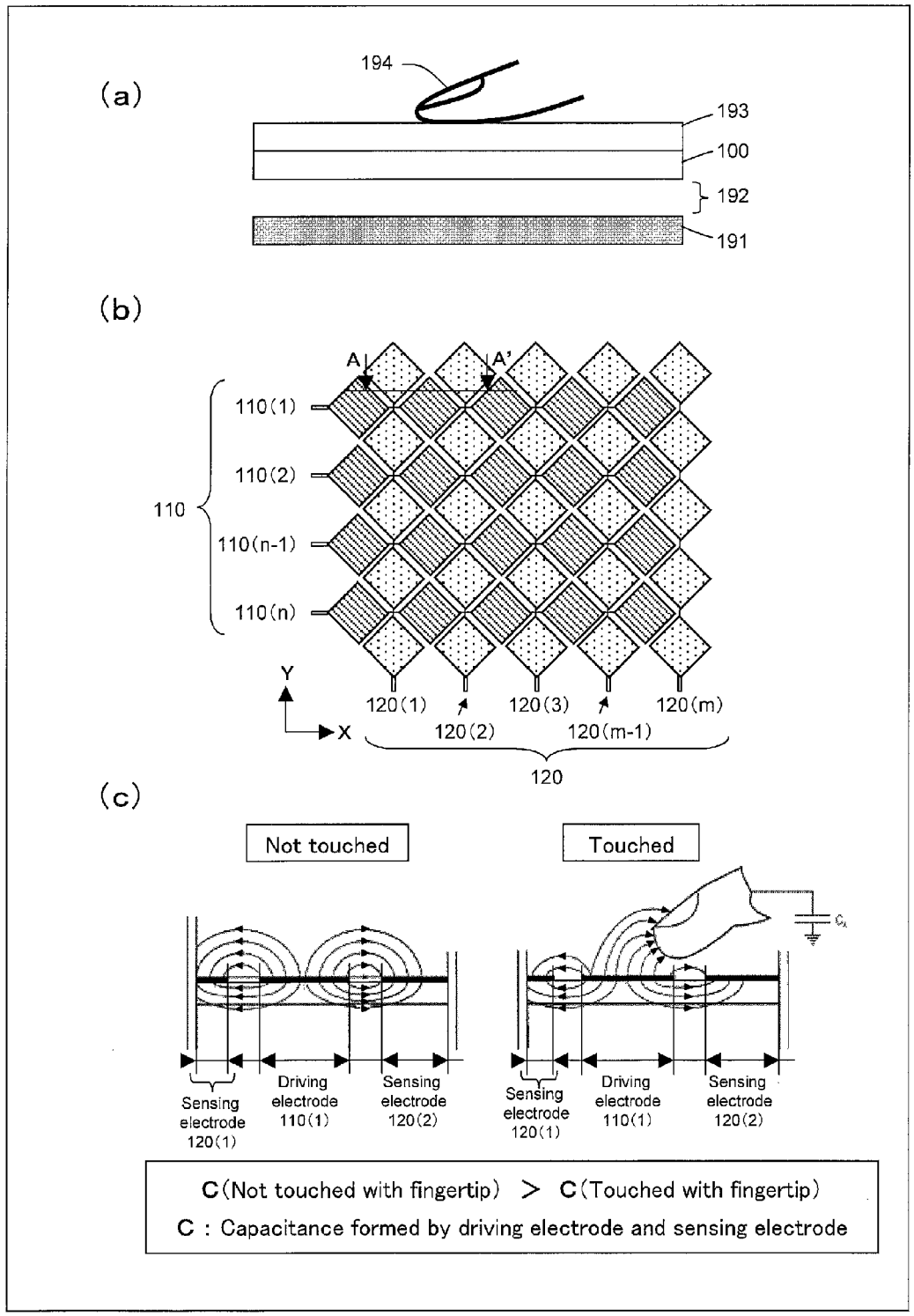
FIG. 14 is an explanatory view explaining a principle of an electrostatic induction touch panel.

FIGS. 7 through 10 illustrate examples where the touch panel is synchronized with a vertical synchronization signal of the display device (1V synchronization driving). FIGS. 11 through 13 illustrate examples where the touch panel is synchronized with a horizontal synchronization signal of the display device (1H synchronization driving). Note that driving of the touch panel, illustrated in FIGS. 7 through 13, is extremely suitably applicable to parallel driving, and is also applicable to sequential driving.

(1V Synchronization Driving)

Figure 7:
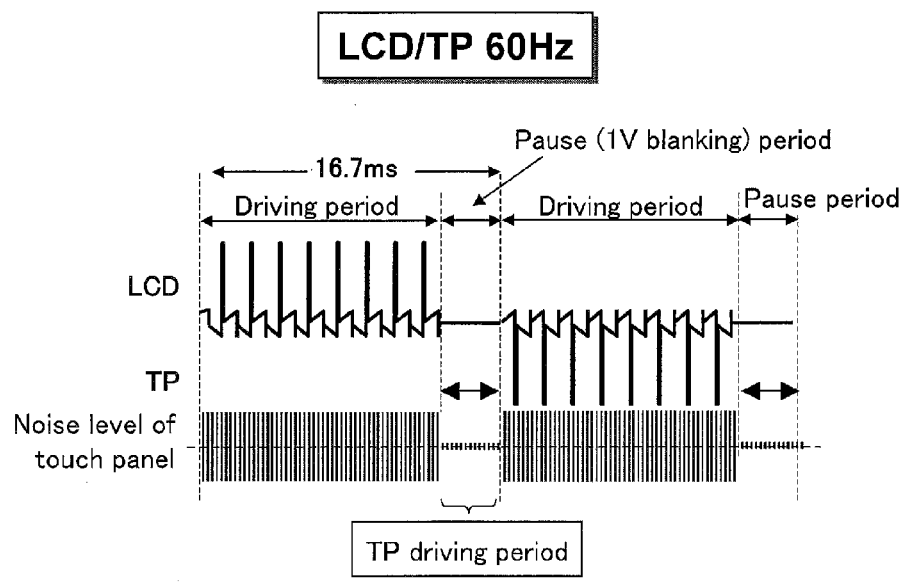
FIG. 7 is an explanatory diagram explaining a first example where the touch panel of the aspect of the present invention is driven in synchronization with driving of a display device integrated with the touch panel.

FIG. 7 illustrates an example where (i) the liquid crystal display device (LCD) is driven at 60 Hz and (ii) the touch panel (TP) is driven during a blanking period (pause period) of a vertical synchronization signal (V synchronization signal).

FIG. 7 illustrates a state where the liquid crystal display device (LCD) is driven and a state where the touch panel (TP) is driven. In FIG. 7, "NOISE LEVEL OF TOUCH PANEL" represents a level of noise of the touch panel integrated with the liquid crystal display device. As illustrated in FIG. 7, the level of noise of the touch panel is high during a driving period during which the liquid crystal display device is driven, whereas the level of noise of the touch panel is low during a blanking period of a vertical synchronization signal (a pause period of a vertical synchronization signal). The touch panel is driven during this blanking period during which the level of noise of the touch panel is low.

In this case, an operation of the liquid crystal display device is completely identical to that of a typical liquid crystal television (TV). It is possible to integrate the touch panel with the liquid crystal display device without changing, for example, a driving method of driving the liquid crystal display device.

The above will be summarized as follows. A touch panel driving circuit which drives driving electrodes of the touch panel, for example, carries out time-sharing driving in synchronization with a vertical synchronization signal of a display device such as a liquid crystal display device to be integrated with the touch panel. The touch panel driving circuit drives the touch panel during a pause period of the vertical synchronization signal.

Figure 8:
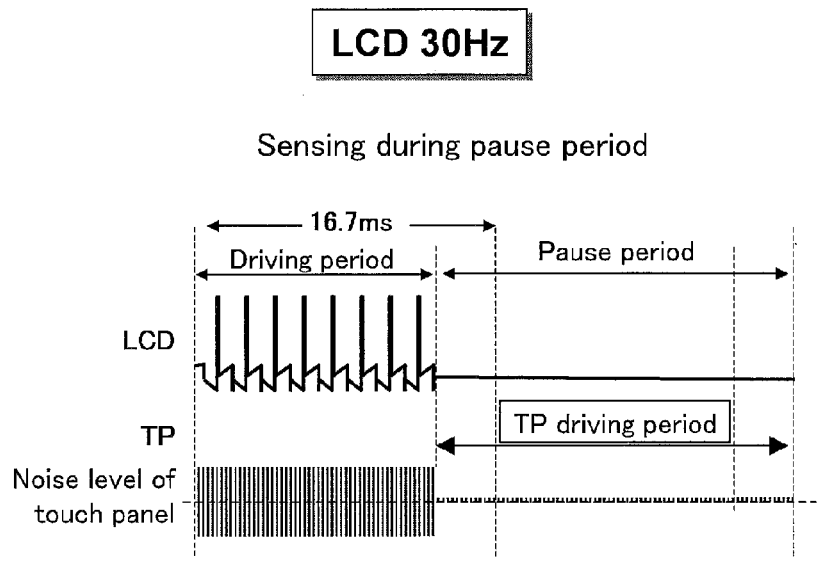
FIG. 8 is an explanatory diagram explaining a second example where the touch panel of the aspect of the present invention is driven in synchronization with the driving of the display device integrated with the touch panel.

FIG. 8 illustrates an example where (i) a liquid crystal display device is driven at a low frequency and (ii) a touch panel is driven during a pause period. For example, in a case where TFTs made of an InGaZnO-based oxide semiconductor are used to drive the liquid crystal display device, an electric current less leaks. Therefore, even driving illustrated in FIG. 8 less exerts an adverse influence, such as flicker, on display, and the liquid crystal display device can attain low power consumption. That is, thanks to characteristics of the InGaZnO-based oxide semiconductor, it is possible to drive the liquid crystal display device at a remarkably low frequency, and to remarkably extensively adjust a pause period during which the liquid crystal display device is not driven.

In a case where a driving circuit of the liquid crystal display device is made up of the TFTs made of the InGaZnO-based oxide semiconductor, the touch panel to be used together with the liquid crystal display device can be further flexibly designed. That is, it is possible to remarkably extensively determine the pause period during which the liquid crystal display device is not driven. It is therefore possible to remarkably flexibly determine the number of times of an operation (operational frequency) of the touch panel which is driven during the pause period during which the liquid crystal display device is not driven. In a case where the number of times of the operation (operational frequency) of the touch panel is fixed, the touch panel can increase the number of times of integral, and can improve an S/N ratio. Note that the terms "LCD", "TP", "NOISE LEVEL OF TOUCH PANEL", etc. in FIG. 8 have the same meanings of those in FIG. 7.

Figure 9:
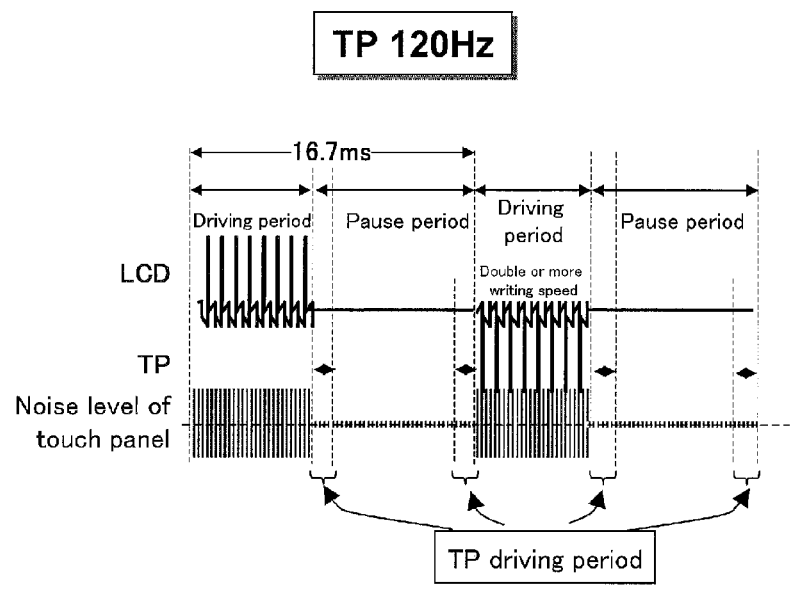
FIG. 9 is an explanatory diagram explaining a third example where the touch panel of the aspect of the present invention is driven in synchronization with the driving of the display device integrated with the touch panel.

FIG. 9 illustrates an example where (i) a liquid crystal display device is driven at 60 Hz, (ii) the liquid crystal display device doubles a writing speed so as to have a pause period, and (iii) a touch panel is driven at a high frequency, i.e., 120 Hz so as to improve a touch detection accuracy in terms of time. The touch panel is driven during a period during which a noise level of the touch panel is low (see FIG. 8). In a case where the touch panel is driven during this period, it is possible to improve an S/N ratio by increasing the number of times of integral.

The liquid crystal display device has the pause period between driving periods. As has been described with reference to FIG. 8, for example, in a case where TFTs made of an InGaZnO-based oxide semiconductor are used to drive the liquid crystal display device, an electric current less leaks. Therefore, even driving illustrated in FIG. 8 less exerts an adverse influence, such as flicker, on display, and the liquid crystal display device can attain low power consumption. Note that the terms "LCD", "TP", "NOISE LEVEL OF TOUCH PANEL", etc. in FIG. 9 have the same meanings of those in FIG. 7.

Since the liquid crystal display device has the pause period between the driving periods, the liquid crystal display device can attain the low power consumption. Therefore, the whole display device provided with the touch panel can save energy. Further, since the touch panel is driven during a short period, the touch panel can attain lower power consumption as compared to the example illustrated in FIG. 8.

Figure 10:
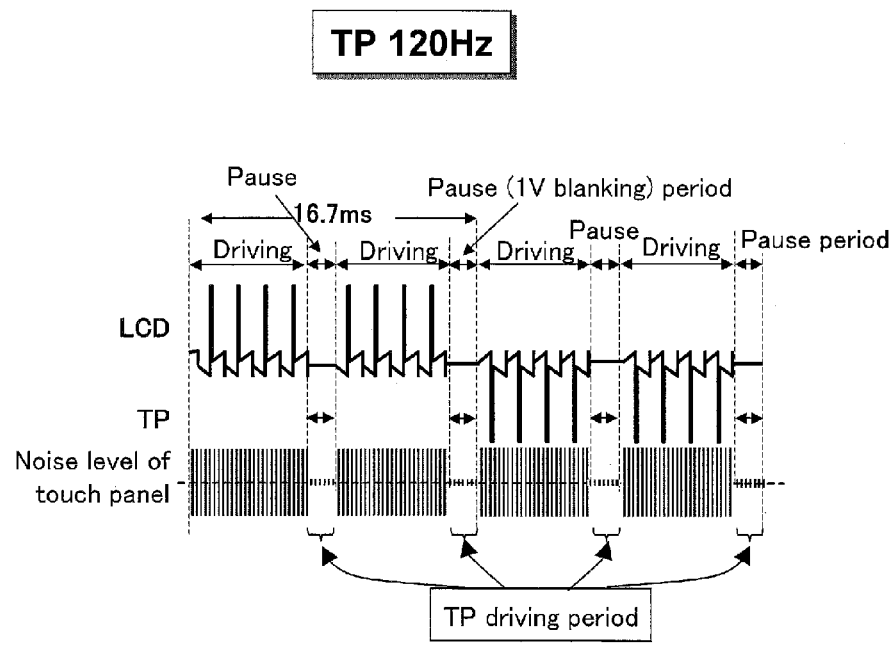
FIG. 10 is an explanatory diagram explaining a fourth example where the touch panel of the aspect of the present invention is driven in synchronization with the driving of the display device integrated with the touch panel.

FIG. 10 illustrates an example where a touch panel is driven during a pause period during which a liquid crystal display device does not carry out writing for display. As illustrated in FIG. 10, one vertical synchronization period includes a pause period during which the liquid crystal display device is not driven, and the touch panel is driven during this pause period. Note that the terms "LCD", "TP", "NOISE LEVEL OF TOUCH PANEL", etc. in FIG. 10 have the same meanings of those in FIG. 7.

This makes it possible to increase an operational frequency of the touch panel, and to improve detection performance of the touch panel. According to the example illustrated in FIG. 9, the touch panel is driven at 120 Hz.

(1H Synchronization Driving)

FIG. 11 illustrates an example where a touch panel is driven in synchronization with a horizontal synchronization signal of a liquid crystal display device during a period during which radiant noise is not present, the radiant noise being caused due to driving of the liquid crystal display device.

In FIG. 11, "SSD(R)", "SSD(G)" and "SSD(B)" represent driving pulses for driving respective sub pixels R, G and B. FIG. 11 illustrates a state where radiant noise is present during an initial charging period during which a source line (SL) of each of sub pixels R, G and B is charged (at timing when an SSD switch is turned on). The touch panel is driven during a period during which no radiant noise is present, i.e., during a period other than the initial charging period. Note that driving of the touch panel is applicable to a self-capacitive touch panel.

This makes it possible to improve detection accuracy of the touch panel while minimizing an influence of radiant noise generated by the liquid crystal display device. Unlike the technique described in Non-Patent Literature 1, the touch panel is driven not only during one horizontal blanking period but also during a period other than the one horizontal blanking period, i.e., can be driven during writing for display of the liquid crystal display device. This allows the touch panel to increase the number of times of integral while avoiding noise, and to improve an SNR, or to be driven at high speed.

Note that "SSD" represents "Source Shared Driving" which is known as a technique of driving each pixel via a switch on a glass substrate. The present invention utilizes this technique in order to reduce the number of connection lines which connect pixels to a source driver IC down to ⅓. The present invention, however, does not essentially require to utilize this technique.

FIG. 12 illustrates a further detailed configuration of the driving of the touch panel illustrated in FIG. 11. (a) of FIG. 12 illustrates a timing chart of the driving of the touch panel. (b) of FIG. 12 illustrates an example of a touch panel driving circuit of the touch panel. Note that this example of the touch panel driving circuit is slightly changed from a touch panel driving circuit described with reference to FIG. 15 so as to be less complicated, but is identical to the touch panel driving circuit illustrated in FIG. 15. Further, reference numerals in (b) of FIG. 12 are identical to those in FIG. 15. Detailed description of an operation of the touch panel driving circuit illustrated in (b) of FIG. 12 is omitted here.

In (a) of FIG. 12, (i) "TP100" represents a pulse waveform of a pulse applied to a driving electrode 100 illustrated (b) of FIG. 12, (ii) "TP SW401" represents a driving pulse for turning on/off a sampling switch 401 illustrated in (b) of FIG. 12, and (iii) "TP404" represents a pulse for driving a reset switch 400. The sampling switch 401 is connected to opposite sides for use in storage at timing of an H-level (high-level) voltage. When the reset switch 400 is tuned on, an electric charge stored in a storage capacitor 402 is reset. Note that (a) of FIG. 12 does not illustrate a state where the reset switch is turned on.

When the sampling switch 401 is controlled in response to an High-level pulse TP SW401 while an High-level pulse having the pulse waveform TP100 is being applied to the driving electrode 100 illustrated in (b) of FIG. 12 (see (a) of FIG. 12), a voltage applied to the driving electrode 100 is applied via a capacitor 105 to the storage capacitor 402. Every time the voltage is applied to the storage capacitor 402, the storage capacitor 402 stores an electric charge.

It is found from (a) of FIG. 12 that, according to this Example, the sampling switch 401 is turned on while no radiant nose is present, and the storage capacitor 402 stores an electric charge while radiant noise is hardly present. During a period during which radiant noise is present, a sensing electrode 104 is electrically disconnected from the storage capacitor 402, and, for example, is grounded. Therefore, influence of the radiant noise can be cancelled. As such, by driving the touch panel in synchronization with a horizontal synchronization signal, it is possible to realize a touch panel which is not affected by noise from a display device such as a liquid crystal display device. Note that this Example is applicable to a self-capacitive method.

The above will be summarized as follows. The touch panel driving circuit which drives the driving electrode of the touch panel carries out time-sharing driving in synchronization with a horizontal synchronization signal of a display device such as the liquid crystal display device. The touch panel driving circuit drives the touch panel during the period other than the initial charging period during which the source line (SL) of each of the sub pixels R, G and B is charged (a period during which the SSD switch is an on state).

FIG. 13 illustrates another example of driving a touch panel in synchronization with a horizontal synchronization signal. (a) of FIG. 13 illustrates a timing chart of the driving of the touch panel. (b) of FIG. 13 illustrates an example of a touch panel driving circuit. Note that (b) of FIG. 13 is identical to (b) of FIG. 12, and this example of the touch panel driving circuit is slightly changed from the touch panel driving circuit described with reference to FIG. 15 so as to be less complicated, but is identical to the touch panel driving circuit illustrated in FIG. 15. Reference numerals in (b) of FIG. 13 are identical to those in FIG. 15. Detailed description of an operation of the touch panel driving circuit illustrated in (b) of FIG. 13 is omitted here.

A sampling switch 401 is in an on state throughout the presence of radiant noise, i.e., throughout a period during which the radiant noise is present (see FIG. 13). By setting as above, i.e., by securing a period which is required for an electric potential of a sensing electrode 104 to return to an initial electric potential at which the sensing electrode 104 is not affected by radiant noise, it is possible to prevent an electric charge stored in a storage capacitor 402 from being affected by noise. It is therefore possible to improve detection accuracy of the touch panel. Note that this Example is applicable to a self-capacitive method.

It is possible to further suitably realize the touch panel driving circuits and the driving methods illustrated in FIGS. 7 through 13, by making TFTs of the display device such as the liquid crystal display device from the InGaZnO-based oxide semiconductor as with the TFTs of the touch panel driving circuits.

That is, in a case where the TFTs of the display device such as the liquid crystal display device is made of the InGaZnO-based oxide semiconductor, high-speed writing to the display device is allowed. For example, in a case of one vertical (1V) synchronization driving (driving in synchronization with a vertical synchronization signal) illustrated in FIGS. 7 through 9, a pause period can be extended in one vertical signal period. This makes it possible to increase the number of times of storage carried out by the storage capacitor in a detection circuit of the touch panel. It is therefore possible to obtain a touch panel having an excellent SNR characteristic.

Since the TFTs made of the InGaZnO-based oxide semiconductor leak less electric current, it is possible to drive the liquid crystal display device at a low frequency (see FIG. 8), and to extend a pause period.

In a case where the touch panel driving circuit 250 is made up of the TFTs made of the InGaZnO-based oxide semiconductor, it is possible to remarkably reduce the number of lines even in a narrow frame, and therefore possible to reduce resistance of the lines. In the case, it is further possible to apply a high voltage, and to increase an SNR of the touch panel.

Further, use of the TFTs made of the InGaZnO-based oxide semiconductor can realize a large-sized screen. Since a high voltage can be applied to the TFTs made of the InGaZnO-based oxide semiconductor, a high voltage utilized by the display device etc. can be shared with the touch panel. Such sharing of a power supply can reduce cost, and can improve a detection signal (signal) of the touch panel. Such improvement of the detection signal makes it possible to advance performance of the touch panel.

The above will be summarized as follows. The touch panel driving circuit which drives driving electrodes of the touch panel carries out time-sharing driving in synchronization with a horizontal synchronization signal of the display device such as the liquid crystal display device. The touch panel driving circuit drives the touch panel during a period overlapping with an initial charging period during which (ii) a source line of each of sub pixels is charged and (ii) radiant noise is present.

A touch panel of Aspect 1 of the present invention is configured to be a touch panel including: a substrate; sensing electrodes and driving electrodes, each for detection of a touched position, provided on an identical surface or different surfaces of the substrate; a touch panel driving circuit which drives the driving electrodes; and a touched position detecting circuit which detects the touched position upon receipt of a detection output from the sensing electrodes, the touch panel driving circuit being made up of TFTs made of an oxide semiconductor.

According to the configuration, the touch panel driving circuit is made up of TFTs made of a metal oxide semiconductor having a wider band gap than silicon. The TFTs made of the metal oxide semiconductor leak a remarkably less photocurrent than TFTs made of silicon. It is therefore possible to reduce power consumption due to leak current. Further, a higher voltage can be applied to the TFTs made of the metal oxide semiconductor than to the TFTs made of silicon. It is therefore possible to utilize, for example, a high voltage utilized by a liquid crystal display device. This increases a signal without increasing cost, thereby improving performance of the touch panel.

The touch panel of Aspect 1 of the present invention is configured to be a touch panel of Aspect 2 of the present invention in which the touch panel driving circuit is provided in a frame region adjacent to a touch electrode region in which the sensing electrodes and the driving electrodes are provided.

According to the configuration, the touch panel driving circuit having a small surface area is provided in the frame region adjacent to the touch electrode region. This eliminates the need for providing in the frame region connection lines which connect the driving electrodes, thereby increasing a surface area of the touch panel. Even if the number of driving electrodes increases, it is unnecessary to increase a width of the frame region, and it is possible to realize a display device having a narrow frame and a large screen. It is further unnecessary to narrow a width of a line provided in the frame region. This prevents characteristics of the touch panel from being deteriorated by increase in resistance of a line part in the frame region.

The touch panel of Aspect 1 or 2 of the present invention is configured to be a touch panel of Aspect 3 of the present invention in which the oxide semiconductor of which the touch panel driving circuit is made is an InGaZnO-based oxide semiconductor.

Since the InGaZnO-based oxide semiconductor has a wider band gap than silicon, and leaks a remarkably less photocurrent than amorphous silicon and polysilicon, it is possible to remarkably reduce power consumption due to leak current. Further, since the TFTs are made of the InGaZnO-based oxide semiconductor, the TFTs themselves have a small surface area, and accordingly, the touch panel driving circuit itself has a small surface area.

The touch panel of Aspect 2 or 3 of the present invention is configured to be a touch panel of Aspect 4 of the present invention in which the sensing electrodes, the driving electrodes, and the touch panel driving circuit are provided on the identical surface of the substrate.

According to the configuration, all of the sensing electrodes, the driving electrodes and the touch panel driving circuit are provided on the identical surface of the substrate. It is therefore possible to easily produce the sensing electrodes, the driving electrodes, and the touch panel driving circuit at a low cost.

The touch panel of any one of Aspects 1 through 4 of the present invention is configured to be a touch panel of Aspect 5 of the present invention in which a color filter is provided on the substrate, the color filter being incorporated in a display device to allow the display device to carry out multicolor display.

According to the configuration, it is possible to obtain a touch panel including the color filter and having a narrow frame. By combining the touch panel with various display devices such as a liquid crystal display device, it is possible to easily configure an extremely-compact and low-cost touch panel integrated display device which has a narrow frame and can carry out multicolor display.

The touch panel of any one of Aspects 1 through 5 of the present invention is configured to be a touch panel of Aspect 6 of the present invention in which the touch panel driving circuit is a sequential driving circuit which sequentially drives the driving electrodes.

According to the configuration, it is possible to, for example, narrow a frame part of the touch panel which (i) carries out sequential driving and (ii) includes the touch panel driving circuit and the touch position detecting circuit which are relatively easily configured. By combining the touch panel with various display devices, it is possible to realize a display device having a narrow frame, a high cost performance, and an excellent design. Since a sequential driving method is currently in widespread use, an existing readout circuit IC or TP (touch panel) controlling IC can be used.

The touch panel of any one of Aspects 1 through 5 of the present invention is configured to be a touch panel of Aspect 7 of the present invention in which the touch panel driving circuit is a parallel driving circuit which drives the driving electrodes in parallel.

According to the configuration, the touch panel is driven by parallel driving. The touch panel can remarkably shorten a sensing period of the touch panel, and therefore can shorten time intervals for detection of a touched position. This allows the touch panel to detect the touched position with a further excellent response. In a case where a sensing time is constant, it is possible to increase the number of times of integral for a storage capacitor in the touch position detecting circuit, and to improve an S/N ratio. It is therefore possible to build an optimal design in accordance with application of the touch panel, such as a design which places importance on a response, or a design which places importance on an S/N ratio. An excellent touch panel can be realized.

The parallel driving is optimal to driving in synchronization with driving of a display device to be integrated with the touch panel. The touch panel is unlikely to be affected by noise of the display device to be integrated with the touch panel. It is further possible to narrow the frame part of the touch panel which carries out the parallel driving. This allows the touch panel to be further flexibly combined with various display devices and to be further flexibly designed.

The touch panel of Aspect 6 or 7 of the present invention is configured to be a touch panel of Aspect 8 of the present invention in which the touch panel driving circuit carries out time-sharing driving in synchronization with a vertical synchronization signal of a display device to be integrated with the touch panel, the touch panel driving circuit driving the touch panel during a pause period of the vertical synchronization signal.

According to the configuration, the touch panel is driven during "a pause period of the vertical synchronization signal", the pause period avoiding radiant noise generated when the display device such as a liquid crystal display device to be integrated with the touch panel is driven. This allows the touch panel to be unlikely to be affected by noise of the display device.

In a case where a driving circuit of the liquid crystal display device etc. to be integrated with the touch panel is made up of TFTs made of an InGaZnO-based oxide semiconductor, the liquid crystal display device can be driven at an extremely low frequency thanks to characteristics of the InGaZnO-based oxide semiconductor. This consequently makes it possible to remarkably flexibly determine an operational frequency of the touch panel which is driven during a pause period during which the liquid crystal display device is not driven. It is therefore possible to increase the number of times of integral, and to improve an S/N ratio of the touch panel.

The touch panel of Aspect 6 or 7 of the present invention is configured to be a touch panel of Aspect 9 of the present invention in which the touch panel driving circuit carries out time-sharing driving in synchronization with a horizontal synchronization signal of a display device to be integrated with the touch panel, the touch panel driving circuit driving the touch panel during a period other than an initial charging period during which a source line of each of sub pixels of the display device is charged.

According to the configuration, the touch panel is driven while avoiding radiant noise generated when the display device such as the liquid crystal display device to be integrated with the touch panel is driven. This allows the touch panel to be unlikely to be affected by noise of the display device and to have an excellent characteristic, for example, to minimize an influence of radiant noise and to increase detection accuracy. Further, according to the configuration, the touch panel is driven in synchronization with a horizontal synchronization signal. As compared to a case where the touch panel is driven in synchronization with a vertical synchronization signal, the touch panel can further increase the operational frequency of the touch panel, and therefore, can detect a touched position at high speed.

The touch panel of Aspect 6 or 7 of the present invention is configured to be a touch panel of Aspect 10 of the present invention in which the touch panel driving circuit carries out time-sharing driving in synchronization with a horizontal synchronization signal of a display device to be integrated with the touch panel, the touch panel driving circuit driving the touch panel during a period overlapping with an initial charging period during which (i) a source line of each of sub pixels of the display device is charged and (ii) radiant noise is present.

According to the configuration, the touch panel is driven (an electric charge is supplied) throughout the period during which radiant noise, generated when the liquid crystal display device is driven, is present. This secures a period which is required for electric potentials of the sensing electrodes to return to an initial electric potential at which the sensing electrodes are not affected by the radiant noise. It is possible to prevent an electric charge of an integral capacitor from being affected by noise. This consequently allows the touch panel to be unlikely to be affected by noise that is generated by the display device such as the liquid crystal display device to be integrated with the touch panel. Further, according to the configuration, the touch panel is driven in synchronization with a horizontal synchronization signal. As compared to a case where the touch panel is driven in synchronization with a vertical synchronization signal, the touch panel can further increase the operational frequency of the touch panel, and therefore, can detect a touched position at high speed. Further, the touch panel (TP) is not driven during one horizontal (1H) blanking period but can be driven simultaneously with writing to a display (the display device). It is therefore possible to increase the number of times of integral, and to realize a high-performance touch panel.

A display device of Aspect 11 of the present invention is configured to be a display device provided with a touch panel, the touch panel including: a substrate; sensing electrodes and driving electrodes, each for detection of a touched position, provided on the substrate; a touch panel driving circuit which drives the driving electrodes; and a touched position detecting circuit which detects the touched position upon receipt of a detection output from the sensing electrodes, the touch panel driving circuit being provided on the substrate in a frame region adjacent to a touch electrode region where the sensing electrodes and the driving electrodes are provided, the touch panel driving circuit being made up of TFTs made of an InGaZnO-based oxide semiconductor, and the sensing electrodes, the driving electrodes, and the touch panel driving circuit, each for detection of the touched position, being provided on a surface of the substrate which surface is on a viewer side.

A display device of Aspect 12 of the present invention is configured to be a display device provided with a touch panel, the touch panel including: a substrate; sensing electrodes and driving electrodes, each for detection of a touched position, provided on the substrate; a touch panel driving circuit which drives the driving electrodes; and a touched position detecting circuit which detects the touched position upon receipt of a detection output from the sensing electrodes, the touch panel driving circuit being provided on the substrate in a frame region adjacent to a touch electrode region where the sensing electrodes and the driving electrodes are provided, the touch panel driving circuit being made up of TFTs made of an InGaZnO-based oxide semiconductor, and the sensing electrodes, the driving electrodes, and the touch panel driving circuit, each for detection of the touched position, being provided on a surface of the substrate which surface is on a side opposite to a viewer side.

According to the configuration, the display device provided with the touch panel can be more compact than a display device provided with a touch panel in which display device a separate touch panel is combined with a display device etc. The driving electrodes, the sensing electrodes, and the touch panel driving circuit, which are included in the touch panel, are not directly exposed outside of the display device. This eliminates the need for providing a special protection film etc. It is therefore possible to prevent increase in cost.

An on-cell touch panel which is mounted on a display device has, for example, the following problems (1) through (3). (1) Electrodes should be provided on opposite surfaces of a substrate of glass etc. Further, one of the opposite surfaces is supported by an interior portion of a production device, and therefore, the one of the opposite surfaces physically comes into contact with the production device. A yield is deteriorated by, e.g., adhesion of particles. (2) A liquid crystal display device requires drop injection of liquid crystal. In a case where a touch panel is produced after the drop injection, substrates made of glass etc. are easily separated from each other in a vacuum device. It is therefore necessary to inject drops of liquid crystal into each display device after the each display device is produced. This results in increasing the number of steps, thereby increasing cost. (3) It is necessary to connect an FPC (Flexible Printed-Circuit Board) to an upper surface of a substrate made of glass etc. This increases cost.

On the other hand, the display device of Aspect 12 of the present invention, having an in-cell structure, is configured so that, particularly, "the sensing electrodes, the driving electrodes, and the touch panel driving circuit, each for detection of the touched position," are provided on "a surface of the substrate which surface is on a side opposite to a viewer side", in other word, these electrodes are provided only on a single surface of the substrate (as has been described). Therefore, the display device of Aspect 12 of the present invention can solve the problems (1) through (3).

A display device of Aspect 13 of the present invention is configured to be a display device provided with a touch panel, the touch panel including: a substrate; sensing electrodes and driving electrodes, each for detection of a touched position, provided on the substrate; a touch panel driving circuit which drives the driving electrodes; and a touched position detecting circuit which detects the touched position upon receipt of a detection output from the sensing electrodes, the touch panel driving circuit being provided in a frame region adjacent to a touch electrode region where the sensing electrodes and the driving electrodes are provided, the touch panel driving circuit being made up of TFTs made of an InGaZnO-based oxide semiconductor, the substrate being provided with (i) a color filter which allows the display device to carry out multicolor display and (ii) a counter common electrode used to drive pixels of the display device, and the touch panel driving circuit being provided on a TFT substrate of the display device on which TFT substrate pixel driving electrodes are provided.

According to the configuration, it is possible to produce the sensing electrodes and the driving electrodes themselves of the touch panel merely by patterning a transparent electrically-conductive film itself of an ITO etc. The touch panel driving circuit can be produced simultaneously with production of TFTs for driving pixels of a liquid crystal display device etc. in a step of producing the TFTs. It is therefore possible to prevent cost from being further increased due to separate production of the touch panel driving circuit.

In a case where, similar to the touch panel driving circuit, a TFT circuit of the display device such as the liquid crystal display device is made of an InGaZnO-based oxide semiconductor, performance of TFTs of the display device is improved, whereby performance of the display device itself is improved. Further, in the case, the display device is easily driven in synchronization with driving of the touch panel. Consequently, the display device can be energy-saving driven without adversely affecting display performance of the display device. The touch panel can be easily driven while being unlikely to be affected by noise generated due to driving of the display device.

The display device of any one of Aspects 11 through 13 of the present invention is configured to be a display device of Aspect 14 of the present invention in which the touch panel driving circuit is a sequential driving circuit which sequentially drives the driving electrodes.

According to the configuration, it is possible to narrow a frame part of a display device which adopts a touch panel including a sequential driving circuit having a relatively simple configuration. It is also possible to provide a display device which is remarkably flexibly designed. Since a sequential driving method is currently in widespread use, an existing readout circuit IC or touch panel controlling IC can be used.

The display device of any one of Aspects 11 through 13 of the present invention is configured to be a display device of Aspect 15 of the present invention in which the touch panel driving circuit is a parallel driving circuit which drives the driving electrodes in parallel.

According to the configuration, the touch panel is driven by parallel driving. The touch panel can remarkably shorten a sensing period of the touch panel, and therefore, can shorten time intervals for detection of a touched position. This makes it possible to realize a touch panel integrated display device which can detect a touched position with a further excellent response. In a case where a sensing time is constant, it is possible to increase the number of times of integral for a storage capacitor in the touch position detecting circuit, and to improve an S/N ratio. It is therefore possible to build an optimal design in accordance with use, such as a design which places importance on a response, or a design which places importance on an S/N ratio. An excellent touch panel integrated display device can be realized.

The parallel driving is optimal to driving in synchronization with driving of the display device. It is therefore possible to realize a touch panel integrated display device which is unlikely to be affected by noise that is generated by a display device. It is further possible to narrow a frame part of the touch panel integrated display device. This allows the touch panel integrated display device to have an excellent design.

The display device of Aspect 14 or 15 of the present invention is configured to be a display device of Aspect 16 of the present invention in which the touch panel driving circuit carries out time-sharing driving in synchronization with a vertical synchronization signal of the display device, the touch panel driving circuit driving the touch panel during a pause period of the vertical synchronization signal.

According to the configuration, the touch panel is driven during "a pause period of the vertical synchronization signal", the pause period avoiding radiant noise generated when the display device such as the liquid crystal display device is driven. It is therefore possible to realize a touch panel integrated display device which is unlikely to be affected by noise generated due to driving of the display device.

In a case where the driving circuit of the display device etc. is made up of TFTs made of an InGaZnO-based oxide semiconductor, the display device can be driven at an extremely low frequency thanks to characteristics of the InGaZnO-based oxide semiconductor. This consequently makes it possible to remarkably flexibly determine an operational frequency of the touch panel which is driven during a pause period during which the display device is not driven. It is therefore possible to, for example, increase the number of times of integral, and improve an S/N ratio of the touch panel. It is further possible to increase the operational frequency of the touch panel within a predetermined period.

Since the InGaZnO-based oxide semiconductor has an electronic mobility higher than that of amorphous silicon, (i) a writing time for writing to a display (the display device) can be shortened (the display device can be driven, for example, at a double, triple or quadruple speed), (ii) one vertical (1V) period can be extended at a display driving frequency of 60 Hz, and (iii) performance of the touch panel can be improved, for example, the operational frequency of the touch panel is increased, or an SNR is improved.

The display device of Aspect 14 or 15 of the present invention is configured to be a display device of Aspect 17 of the present invention in which the touch panel driving circuit carries out time-sharing driving in synchronization with a horizontal synchronization signal of the display device, the touch panel driving circuit driving the touch panel during a period other than an initial charging period during which a source line of each of sub pixels of the display device is charged.

According to the configuration, the touch panel is driven while avoiding radiant noise generated when the display device such as the liquid crystal display device is driven. It is therefore possible to realize a touch panel integrated display device which (i) is unlikely to be affected by noise of a display device, for example, minimizes an influence of radiant noise and (ii) has an excellent characteristic, for example, increases detection accuracy of a touch panel.

Further, according to the configuration, the touch panel is driven in synchronization with a horizontal synchronization signal. As compared to a case where the touch panel is driven in synchronization with a vertical synchronization signal, the touch panel can further increase the operational frequency of the touch panel, and therefore, can detect a touched position at high speed.

The display device of Aspect 14 or 15 of the present invention is configured to be a display device of Aspect 18 of the present invention in which the touch panel driving circuit carries out time-sharing driving in synchronization with a horizontal synchronization signal of the display device, the touch panel driving circuit driving the touch panel during a period overlapping with an initial charging period during which (i) a source line of each of sub pixels of the display device is charged and (ii) radiant noise is present.

According to the configuration, the touch panel is driven (an electric charge is supplied) throughout the period during which radiant noise, generated when the liquid crystal display device is driven, is present. This secures a period which is required for electric potentials of the sensing electrodes to return to an initial electric potential at which the sensing electrodes are not affected by the radiant noise. It is possible to prevent an electric charge of an integral capacitor from being affected by noise. This can consequently realize a touch panel integrated display device which is unlikely to be affected by noise that is generated by a display device. Further, according to the configuration, the touch panel is driven in synchronization with a horizontal synchronization signal. As compared to a case where the touch panel is driven in synchronization with a vertical synchronization signal, the touch panel can further increase the operational frequency of the touch panel, and therefore, can detect a touched position at high speed. Further, the touch panel is not driven during one horizontal (1H) blanking period but can be driven simultaneously with writing to the display device. It is therefore possible to increase the number of times of integral, and to realize a high-performance touch panel.

The touch panel integrated display device of any one of Aspects 11 through 18 of the present invention is configured to be a touch panel integrated display device of Aspect 19 of the present invention in which the touch panel integrated display device is a liquid crystal display device.

According to the configuration, it is possible to obtain a touch panel integrated liquid crystal display device having a narrow frame, an excellent design, and a remarkable flexibility in being incorporated in various apparatuses. Further, a touch panel can be produced with a production process of producing a liquid crystal display device. It is therefore possible to produce a touch panel having a finer pitch as compared to a touch panel produced by means of printing etc. It is also possible to realize an on-cell touch panel having a narrow frame, and an in-cell touch panel. Further, an existing device can be used.

The touch panel integrated display device of any one of Aspects 11 through 18 of the present invention is configured to be a touch panel integrated display device of Aspect 20 of the present invention in which the touch panel integrated display device is an EL display device.

According to the configuration, it is possible to obtain a touch panel integrated EL display device having a narrow frame, an excellent design, and a remarkable flexibility in being incorporated in various apparatuses. Further, a touch panel can be produced with a production process of producing an EL display device. It is therefore possible to produce a touch panel having a finer pitch as compared to a touch panel produced by means of printing etc. It is also possible to realize an on-cell touch panel having a narrow frame, and an in-cell touch panel. Further, an existing device can be used. It is further possible to realize (i) a transparent display provided with a touch panel, application of the transparent display to a showcase having been studied, and (ii) a flexible display provided with a touch panel.

The present invention is not limited to the description of the above embodiment, and can therefore be modified by a skilled person in the art within the scope of the claims. Namely, an embodiment derived from a proper combination of technical means disclosed in different embodiments is encompassed in the technical scope of the present invention. Moreover, it is possible to obtain a new technical feature from a proper combination of technical means disclosed in different embodiments.

INDUSTRIAL APPLICABILITY

The present invention provides a high-performance touch panel which (i) has a narrow frame, (ii) allows high-speed writing, and (iii) has an excellent resistance to noise of a display device. The present invention also provides a display device integrated with the high-performance touch panel. The present invention has a high industrial applicability.

REFERENCE SIGNS LIST

200: Touch panel
210: Substrate
215: CF glass substrate
220: Driving electrode group
220(1), 220(n−1), 220(n), and 220(n+1): Driving electrode
221: Connection line group for connection of driving electrodes
230: Sensing electrode group
230(m−1), 230(m), and 230(m+1): Sensing electrode
231: Connection line group for connection of sensing electrodes
240: Substrate
241: Control circuit which includes a detection circuit
250: Touch panel driving circuit
251: Connection line group which connects a control circuit to a touch panel driving circuit
260: Counter transparent electrode
270: Electrically-insulating layer
271: Electrically-insulating layer
280: Metallic mesh
290: Color filter
300: Display device
310: TFT glass substrate
320: Liquid crystal layer

The invention claimed is:
1. A touch panel comprising:
a substrate;
sensing electrodes and driving electrodes, each of the sensing electrodes and the driving electrodes providing detection of a touched position;
a touch panel driving circuit that drives the driving electrodes; and
a touched position detecting circuit that detects the touched position upon receipt of a detection output from the sensing electrodes, wherein
the touch panel driving circuit includes a plurality of thin-film transistors of an oxide semiconductor,
the touch panel driving circuit is in a frame region adjacent to a touch electrode region in which the sensing electrodes and the driving electrodes are located, and
the sensing electrodes, the driving electrodes, and the touch panel driving circuit are on a same surface of the substrate, wherein
the touch panel driving circuit is a sequential driving circuit which sequentially drives the driving electrodes, and
the touch panel driving circuit carries out time-sharing driving in synchronization with a horizontal synchronization signal of a display device to be integrated with the touch panel, the touch panel driving circuit driving the touch panel during a period other than an initial charging period during which a source line of each of sub pixels of the display device is charged.

2. A touch panel integrated display device comprising a touch panel recited in claim 1.

3. A touch panel comprising:
a substrate;
sensing electrodes and driving electrodes, each of the sensing electrodes and the driving electrodes providing detection of a touched position;
a touch panel driving circuit that drives the driving electrodes; and
a touched position detecting circuit that detects the touched position upon receipt of a detection output from the sensing electrodes, wherein
the touch panel driving circuit includes a plurality of thin-film transistors of an oxide semiconductor,
the touch panel driving circuit is in a frame region adjacent to a touch electrode region in which the sensing electrodes and the driving electrodes are located, and
the sensing electrodes, the driving electrodes, and the touch panel driving circuit are on a same surface of the substrate, wherein
the touch panel driving circuit is a sequential driving circuit which sequentially drives the driving electrodes, and
the touch panel driving circuit carries out time-sharing driving in synchronization with a horizontal synchronization signal of a display device to be integrated with the touch panel, the touch panel driving circuit driving the touch panel during a period overlapping with an initial charging period during which (i) a source line of each of sub pixels of the display device is charged and (ii) radiant noise is present.

4. A touch panel integrated display device comprising a touch panel recited in claim 3.

5. A touch panel comprising:
a substrate;
sensing electrodes and driving electrodes, each of the sensing electrodes and the driving electrodes providing detection of a touched position;
a touch panel driving circuit that drives the driving electrodes; and
a touched position detecting circuit that detects the touched position upon receipt of a detection output from the sensing electrodes, wherein
the touch panel driving circuit includes a plurality of thin-film transistors of an oxide semiconductor,
the touch panel driving circuit is in a frame region adjacent to a touch electrode region in which the sensing electrodes and the driving electrodes are located, and the sensing electrodes, the driving electrodes, and the touch panel driving circuit are on a same surface of the substrate, wherein the touch panel driving circuit is a parallel driving circuit which drives the driving electrodes in parallel, and the touch panel driving circuit carries out time-sharing driving in synchronization with a horizontal synchronization signal of a display device to be integrated with the touch panel, the touch panel driving circuit driving the touch panel during a period other than an initial charging period during which a source line of each of sub pixels of the display device is charged.

6. A touch panel integrated display device comprising a touch panel recited in claim 5.

7. A touch panel comprising:

a substrate;

sensing electrodes and driving electrodes, each of the sensing electrodes and the driving electrodes providing detection of a touched position;

a touch panel driving circuit that drives the driving electrodes; and a touched position detecting circuit that detects the touched position upon receipt of a detection output from the sensing electrodes, wherein the touch panel driving circuit includes a plurality of thin-film transistors of an oxide semiconductor, the touch panel driving circuit is in a frame region adjacent to a touch electrode region in which the sensing electrodes and the driving electrodes are located, and the sensing electrodes, the driving electrodes, and the touch panel driving circuit are on a same surface of the substrate, wherein the touch panel driving circuit is a parallel driving circuit which drives the driving electrodes in parallel, and the touch panel driving circuit carries out time-sharing driving in synchronization with a horizontal synchronization signal of a display device to be integrated with the touch panel, the touch panel driving circuit driving the touch panel during a period overlapping with an initial charging period during which (i) a source line of each of sub pixels of the display device is charged and (ii) radiant noise is present.

8. A touch panel integrated display device comprising a touch panel recited in claim 7.

* * * * *